(12) United States Patent
Jang et al.

(10) Patent No.: US 10,747,347 B2
(45) Date of Patent: Aug. 18, 2020

(54) TOUCH DISPLAY DEVICE, TOUCH DISPLAY PANEL, AND DRIVING CIRCUIT

(71) Applicant: LG Display Co., Ltd., Seoul (KR)

(72) Inventors: Hoon Jang, Goyang-si (KR);
SoonDong Cho, Gumi-si (KR);
Wonyong Jang, Bucheon-si (KR)

(73) Assignee: LG Display Co., Ltd., Seoul (KR)

( * ) Notice: Subject to any disclaimer, the term of this patent is extended or adjusted under 35 U.S.C. 154(b) by 0 days.

(21) Appl. No.: 16/142,640

(22) Filed: Sep. 26, 2018

(65) Prior Publication Data

US 2019/0102022 A1 Apr. 4, 2019

(30) Foreign Application Priority Data

Sep. 29, 2017 (KR) .................. 10-2017-0128199

(51) Int. Cl.
*G06F 3/041* (2006.01)
*G06F 3/044* (2006.01)
*G09G 5/00* (2006.01)

(52) U.S. Cl.
CPC ............ *G06F 3/0412* (2013.01); *G06F 3/044* (2013.01); *G06F 3/0416* (2013.01); *G09G 5/006* (2013.01); *G06F 2203/04107* (2013.01); *G09G 2310/0267* (2013.01); *G09G 2310/0275* (2013.01); *G09G 2370/08* (2013.01)

(58) Field of Classification Search
CPC .............. G06F 3/044; G06F 3/0412; G06F 2203/04106; G06F 3/016; G06F 3/04166
See application file for complete search history.

(56) References Cited

U.S. PATENT DOCUMENTS

| | | |
|---|---|---|
| 2015/0091850 A1 | 4/2015 | Morein |
| 2016/0180814 A1 | 6/2016 | Morein et al. |
| 2016/0195999 A1 | 7/2016 | Reynolds et al. |
| 2017/0046004 A1 | 2/2017 | Choi |
| 2018/0074629 A1* | 3/2018 | Lee ...................... G02F 1/13338 |
| 2018/0136778 A1* | 5/2018 | Choi ..................... G06F 3/0412 |

FOREIGN PATENT DOCUMENTS

| | | |
|---|---|---|
| EP | 3040827 A1 | 7/2016 |
| JP | 2016-126765 A | 7/2016 |
| JP | 2016-532231 A | 10/2016 |
| WO | 2015/047550 A | 4/2015 |

OTHER PUBLICATIONS

Extended European Search Report dated Feb. 14, 2019, issued in corresponding European Patent Application No. 18195406.6.
First Office Action dated Jun. 30, 2020, issued in corresponding Japanese Patent Application No. 2018-186358.

* cited by examiner

*Primary Examiner* — Gerald Johnson
(74) *Attorney, Agent, or Firm* — Morgan, Lewis & Bockius LLP

(57) ABSTRACT

Disclosed are a touch display device, a touch display panel, and a driving circuit. More specifically, the present disclosure provides a touch display device, a touch display panel, and a driving circuit which can simultaneously perform display driving and touch driving through a ground modulation technique.

18 Claims, 26 Drawing Sheets

TOUCH DISPLAY DEVICE, TOUCH DISPLAY PANEL, AND DRIVING CIRCUIT

CROSS REFERENCE TO RELATED APPLICATION

This application claims priority from Korean Patent Application No. 10-2017-0128199, filed on Sep. 29, 2017, which is hereby incorporated by reference for all purposes as if fully set forth herein.

BACKGROUND

1. Technical Field

The present disclosure relates to a touch display device, a touch display panel, and a driving circuit.

2. Description of the Related Art

With the advancement of an information-oriented society, various requirements for display devices for displaying images have been increasing, and use has recently been made of various display devices, such as Liquid Crystal Display (LCD) devices, Plasma Display Panel (PDP) devices, and Organic Light-Emitting Display (OLED) devices.

Among such display devices, there is a touch display device that departs from a conventional input scheme using a button, a keyboard, or a mouse, and provides a touch-based input scheme which enables a user to easily, conveniently, and intuitively input information or a command.

Since such a touch display device needs to provide both an image display function and a touch sensing function, in the touch display device, a driving time such as a frame time is divided into a display driving interval and a touch driving interval, and display driving is performed during a display driving interval and touch driving and touch sensing are performed during a touch driving interval starting after the display driving interval.

In order to perform display driving and touch driving in a time-division manner, the above-described time-division driving scheme may require significantly precise timing control and may require expensive components for this configuration.

Also, the time-division driving scheme is disadvantageous in that both image quality and touch sensitivity are degraded due to a shortage of both a display driving time and a touch driving time. Particularly, due to time-division driving, the time-division driving scheme cannot provide high-resolution image quality.

SUMMARY

Accordingly, embodiments of the present disclosure are directed to a touch display device, a touch display panel, and a driving circuit that substantially obviate one or more of the problems due to limitations and disadvantages of the related art.

An aspect of the present disclosure is to provide a touch display device, a touch display panel, and a driving circuit which can simultaneously perform display driving and touch driving.

Another aspect of the present disclosure is to provide a touch display device, a touch display panel, and a driving circuit which can simultaneously perform display driving and touch driving through a ground modulation technique.

Still another aspect of the present disclosure is to provide a touch display device, a touch display panel, and a driving circuit which can simultaneously perform display driving and touch driving without causing a harmful mutual influence between display driving and touch driving.

Yet another aspect of the present disclosure is to provide a touch display device, a touch display panel, and a driving circuit which can perform display driving and touch driving by utilizing two types of grounds.

Still yet another aspect of the present disclosure is to provide a touch display device, a touch display panel, and a driving circuit which can normally deliver a signal between differently-grounded components.

Additional features and aspects will be set forth in the description that follows, and in part will be apparent from the description, or may be learned by practice of the inventive concepts provided herein. Other features and aspects of the inventive concepts may be realized and attained by the structure particularly pointed out in the written description, or derivable therefrom, and the claims hereof as well as the appended drawings.

In accordance with an aspect of the present disclosure, there may be provided a touch display device including: a touch display panel having multiple data lines and multiple gate lines arranged therein, having multiple touch electrodes arranged therein, and having multiple touch lines, which are electrically connected to the multiple touch electrodes so as to correspond to the multiple touch electrodes, arranged therein; a touch driving circuit configured to drive at least one touch electrode among the multiple touch electrodes; and a touch controller configured to sense whether there is a touch made by at least one of a finger and a pen, or a position of the touch on the basis of touch sensing data received from the touch driving circuit.

In the touch display device, the touch controller may be grounded to a primary ground, and the touch display panel may be grounded to a secondary ground which is a ground different from the primary ground.

The touch display device may further include a ground modulation circuit configured to apply a modulation signal to the primary ground or the secondary ground such that one ground voltage among a primary ground voltage of the primary ground and a secondary ground voltage of the secondary ground becomes a modulated ground voltage as compared with the remaining ground voltage.

In accordance with another aspect of the present disclosure, there may be provided a touch display panel including: multiple data lines for data driving; multiple gate lines for gate driving; multiple touch electrodes for touch sensing; and multiple touch lines electrically connected to the multiple touch electrodes.

In the touch display panel, data voltages may be applied to the multiple data lines while a touch driving signal is applied to at least one touch electrode among the multiple touch electrodes.

The touch driving signal applied to the at least one touch electrode among the multiple touch electrodes may have at least one signal characteristic corresponding to a signal characteristic of a ground voltage of a ground, to which the touch display panel is grounded, among signal characteristics including a frequency, a phase, a voltage polarity, and an amplitude.

In accordance with still another aspect of the present disclosure, there may be provided a driving circuit for driving a touch display panel having multiple data lines and multiple gate lines arranged therein, having multiple touch electrodes arranged therein, and having multiple touch lines, which are electrically connected to the multiple touch electrodes so as to correspond to the multiple touch electrodes, arranged therein.

The driving circuit may include: a data input unit configured to receive, as input, image data from a display controller; a data converter configured to convert the image data into data voltages corresponding to analog voltages; and a data output unit configured to output the data voltages to data lines.

The data input unit may receive, as input, the image data from the display controller grounded to a primary ground.

The data output unit may output the data voltages to data lines arranged in the touch display panel grounded to a secondary ground which is a ground different from the primary ground.

The driving circuit may further include a signal delivery circuit configured to deliver a signal between the driving circuit and the display controller.

The signal delivery circuit may be grounded to the primary ground and the secondary ground.

In accordance with yet another aspect of the present disclosure, there may be provided a driving circuit for driving a touch display panel having multiple data lines and multiple gate lines arranged therein, having multiple touch electrodes arranged therein, and having multiple touch lines, which are electrically connected to the multiple touch electrodes so as to correspond to the multiple touch electrodes, arranged therein.

The driving circuit may include: a pre-amplifier configured to receive touch sensing signals from the touch electrodes; an integrator configured to integrate a signal output from the pre-amplifier; and an analog-to-digital converter configured to output touch sensing data obtained by converting an integration value output from the integrator into a digital value.

The analog-to-digital converter may output the touch sensing data to a touch controller grounded to a primary ground.

The pre-amplifier may receive a touch sensing signals from the touch electrodes arranged in the touch display panel grounded to a secondary ground which is a ground different from the primary ground.

The driving circuit may further include a signal delivery circuit configured to deliver a signal between the driving circuit and the touch controller.

The signal delivery circuit may be grounded to the primary ground and the secondary ground.

In accordance with still yet another aspect of the present disclosure, there may be provided a touch display device including: a touch display panel having multiple data lines and multiple gate lines arranged therein, having multiple touch electrodes arranged therein, and having multiple touch lines, which are electrically connected to the multiple touch electrodes so as to correspond to the multiple touch electrodes, arranged therein; a driving circuit configured to drive the touch display panel; and a controller configured to control the driving circuit.

In the touch display device, the controller may be grounded to a primary ground, and the touch display panel may be grounded to a secondary ground which is a ground different from the primary ground.

A secondary voltage of the secondary ground may be a modulated ground voltage as compared with a primary ground voltage of the primary ground.

The touch display device may further include a power source separation circuit configured to electrically separate the primary ground from the secondary ground.

The above-described embodiments of the present disclosure provide a touch display device, a touch display panel, and a driving circuit which can simultaneously perform display driving and touch driving.

The above-described embodiments of the present disclosure provide a touch display device, a touch display panel, and a driving circuit which can simultaneously perform display driving and touch driving through a ground modulation technique.

The above-described embodiments of the present disclosure provide a touch display device, a touch display panel, and a driving circuit which can simultaneously perform display driving and touch driving without causing a harmful mutual influence between display driving and touch driving.

The above-described embodiments of the present disclosure provide a touch display device, a touch display panel, and a driving circuit which can perform display driving and touch driving by utilizing two types of grounds.

The above-described embodiments of the present disclosure provide a touch display device, a touch display panel, and a driving circuit which can no ally deliver a signal between differently-grounded components.

It is to be understood that both the foregoing general description and the following detailed description are exemplary and explanatory and are intended to provide further explanation of the inventive concepts as claimed.

BRIEF DESCRIPTION OF THE DRAWINGS

The accompanying drawings, which are included to provide a further understanding of the disclosure and are incorporated and constitute a part of this application, illustrate embodiments of the disclosure and together with the description serve to explain various principles. In the drawings.

DETAILED DESCRIPTION

Figure 1:
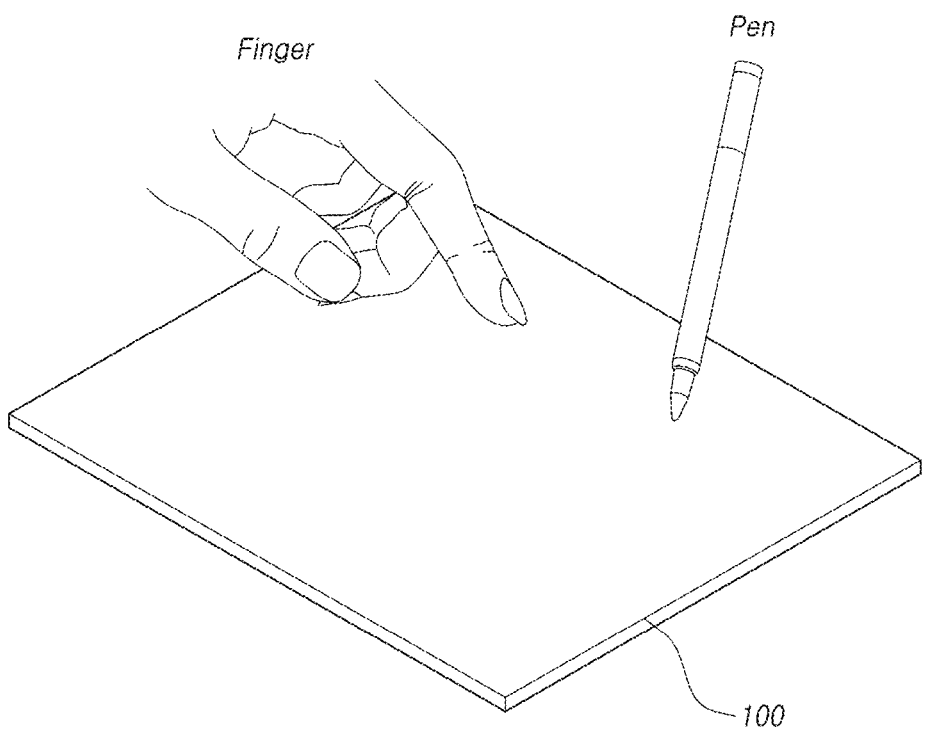
FIG. 1 is a view illustrating a touch display device according to embodiments of the present disclosure.

Hereinafter, exemplary embodiments of the present disclosure will be described in detail with reference to the accompanying drawings. In assigning reference numerals to elements in the drawings, the same reference numerals will designate the same elements where possible although they are shown in different drawings. Also, in the following description of the present disclosure, a detailed description of known functions and configurations incorporated herein will be omitted when it may make the subject matter of the present disclosure rather unclear.

In addition, such terms as "first", "second", "A", "B", "(a)", "(b)", and the like, may be used herein when describing elements of the present disclosure. These terms are merely used to distinguish one element from other elements, and the essence of a corresponding element, an order thereof, a sequence thereof, or the number of the corresponding elements are not limited by the terms. When an element is described as being "connected", "coupled", or "linked" to another element, it will be understood that the element may not only be directly connected or coupled to said another element, but may also be "connected", "coupled", or "linked" to said another element through a third element, or the third element may also be interposed between the element and said another element.

FIG. 1 is a view illustrating a touch display device 100 according to embodiments of the present disclosure.

The touch display device 100 according to embodiments of the present disclosure may not only provide an image display function, but may also provide a touch sensing function made by a finger, a pen, and/or the like.

Examples of the pen may include: an active pen that has a signal transmission/reception function, is capable of operating in conjunction with the touch display device 100, or includes its own power source; a passive pen that does not have a signal transmission/reception function, its own power source, and the like; and the like.

The touch display device 100 according to embodiments of the present disclosure may be, for example, a television (TV) or a monitor, or a mobile device, such as a tablet personal computer or a smart phone.

The touch display device 100 according to embodiments of the present disclosure may include a display part configured to provide an image display function, and a touch sensing part configured to sense a touch.

Figure 2:
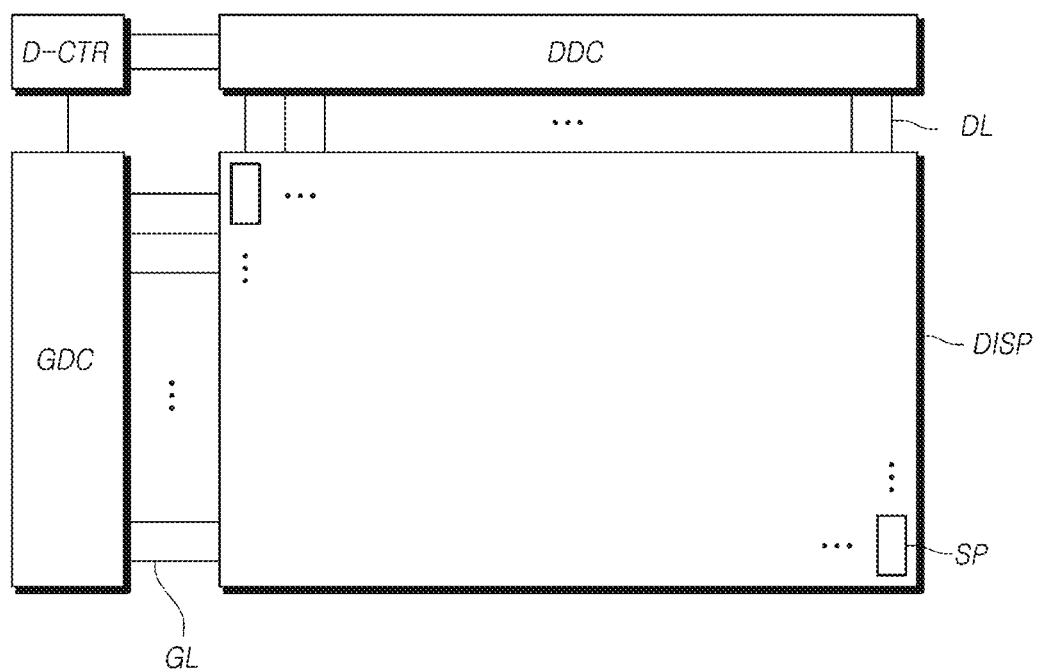
FIG. 2 is a block diagram illustrating a display part of a touch display device according to embodiments of the present disclosure.
Figure 3:
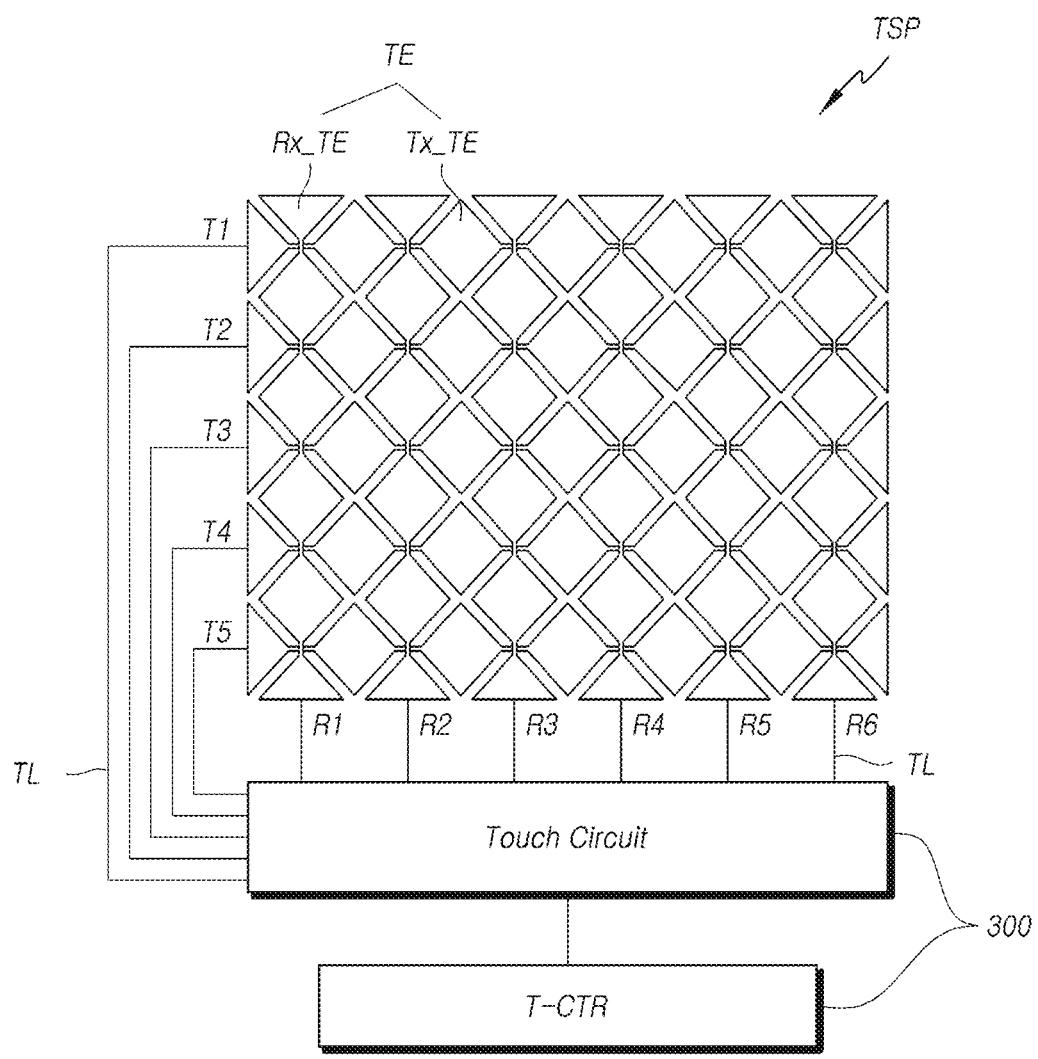
FIG. 3 is a block diagram illustrating a touch sensing part for mutual-capacitance-based touch sensing in a touch display device according to embodiments of the present disclosure.
Figure 4:
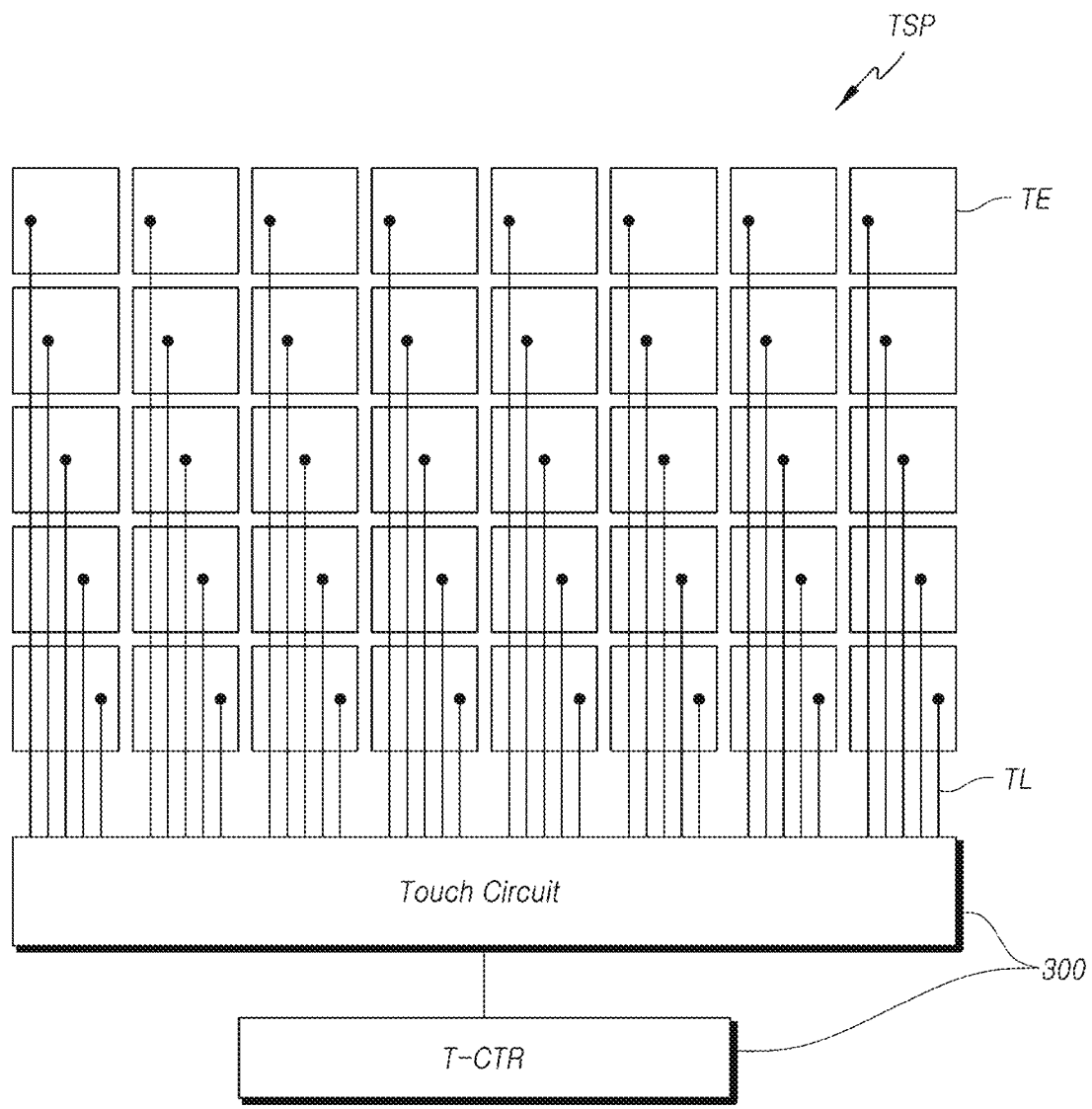
FIG. 4 is a block diagram illustrating a touch sensing part for self-capacitance-based touch sensing in a touch display device according to embodiments of the present disclosure.

Referring to FIGS. 2 to 4, a structure of each of the display part and the touch sensing part of the touch display device 100 will be briefly described below.

FIG. 2 is a block diagram illustrating the display part of the touch display device 100 according to embodiments of the present disclosure.

Referring to FIG. 2, the display part of the touch display device 100 according to embodiments of the present disclosure may include a display panel DISP, a data driving circuit DDC, a gate driving circuit GDC, a display controller D-CTR, and the like.

The display panel DISP may have multiple data lines DL and multiple gate lines GL arranged therein, and may have multiple sub-pixels SP, which are defined by the multiple data lines DL and the multiple gate lines GL, arranged therein.

The data driving circuit DDC may supply a data voltage to each of the multiple data lines DL and may drive the multiple data lines DL.

The gate driving circuit GDC may sequentially supply a scan signal to the multiple gate lines GL and may drive the multiple gate lines GL.

The display controller D-CTR may respectively supply various control signals DCS and GCS to the data driving circuit DDC and the gate driving circuit GDC and may control an operation of each of the data driving circuit DDC and the gate driving circuit GDC.

The display controller D-CTR: may start a scan according to timing implemented in each frame; may change input image data, which is input from the outside, so as to meet a data signal format used by the data driving circuit DDC, and may output the changed image data Data; and may control data driving at an appropriate time according to the scan.

The display controller D-CTR may be a timing controller TCON used in the conventional display technology or a control apparatus that includes the timing controller and further performs other control functions.

The display controller D-CTR may be implemented as a component separate from the data driving circuit DDC, or the same, together with the data driving circuit DDC, may be implemented as an Integrated Circuit (IC).

The data driving circuit DDC may be implemented such that at least one source driver IC is included therein.

Each source driver IC may include a shift register, a latch circuit, a Digital-to-Analog Converter (DAC), an output buffer, and the like.

According to the circumstances, each source driver IC may further include an Analog-to-Digital Converter (ADC).

The gate driving circuit GDC may be implemented such that at least one gate driver IC is included therein.

Each gate driver IC may include a shift register, a level shifter, and the like.

The data driving circuit DDC may be disposed on only one side (e.g., the upper or lower side) of the display panel DISP, or may be disposed on both sides (e.g., the upper and lower sides) of the display panel DISP according to a driving scheme, a panel design scheme, and the like in some cases.

The gate driving circuit GDC may be disposed on only one side (e.g., the left or right side, or the upper or lower side) of the display panel DISP, or may be disposed on both sides (e.g., the left and right sides) of the display panel DISP according to a driving scheme, a panel design scheme, and the like in some cases.

The display panel DISP may be various types of display panels, including an LCD panel, an OLED panel, a PDP, and the like.

Figure 5:
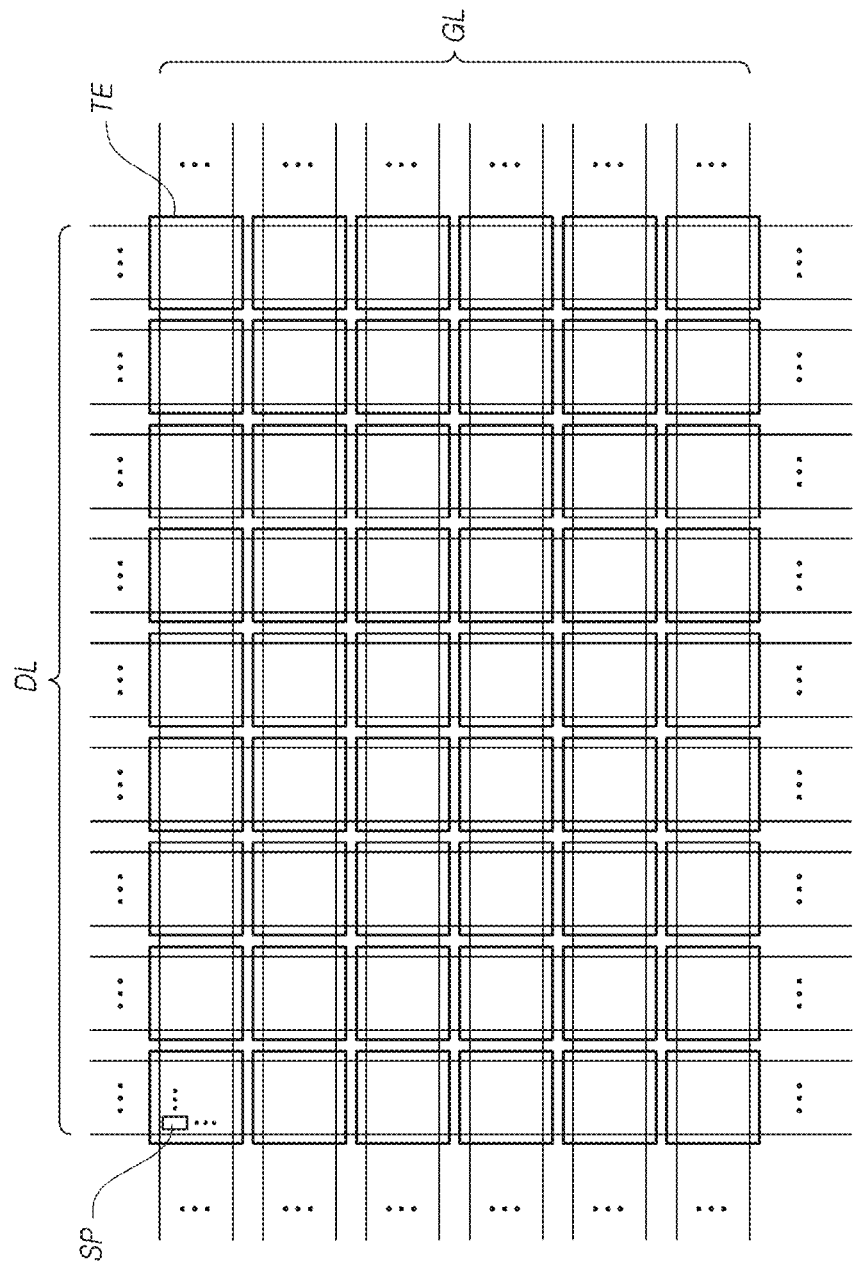
FIG. 5 is a view illustrating a display panel having a built-in touch screen panel in a touch display device according to embodiments of the present disclosure.

FIGS. 3 and 4 are block diagrams illustrating two types of touch sensing parts in the touch display device 100 according to embodiments of the present disclosure. FIG. 5 is a view illustrating a relationship between signal wires DL and GL in the display panel DISP and touch electrodes TE in a touch screen panel TSP in the touch display device 100 according to embodiments of the present disclosure.

As illustrated in FIGS. 3 and 4, in order to sense a touch input made by a finger and/or pen, the touch display device 100 according to embodiments of the present disclosure may include the touch screen panel TSP having multiple touch electrodes TE arranged therein, and a touch circuit 300 configured to drive the touch screen panel TSP.

The touch display device 100 may provide a mutual-capacitance-based touch sensing function of sensing a touch input by measuring a capacitance, which is formed between two types of touch electrodes Tx_TE and Rx_TE in the touch screen panel TSP illustrated as an example in FIG. 3, or a variation of the capacitance.

Alternatively, the touch display device 100 may provide a self-capacitance-based touch sensing function of sensing a touch input by measuring a capacitance, which is formed at each touch electrode TE in the touch screen panel TSP illustrated as an example in FIG. 4, or a variation of the capacitance.

Referring to FIG. 3, for mutual-capacitance-based touch sensing, in the touch screen panel TSP, first touch electrode lines (which may also be referred to as "touch driving lines") T1 to T5, to which a touch driving signal is applied, and second touch electrode lines (which may also be referred to as "touch sensing lines") R1 to R6, from which touch sensing signals are sensed, are arranged such that the former and the latter intersect.

Each of the first touch electrode lines T1 to T5 may be one bar-shaped electrode that horizontally extends, and each of the second touch electrode lines R1 to R6 may be one bar-shaped electrode that vertically extends.

Otherwise, as illustrated in FIG. 3, each of the first touch electrode lines T1 to T5 may be formed by first touch electrodes (which may also be referred to as "touch driving electrodes") Tx_TE that are arranged in the same row and are electrically connected. Each of the second touch electrode lines R1 to R6 may be formed by second touch electrodes (which may also be referred to as "touch sensing electrodes") Rx_TE that are arranged in the same column and are electrically connected.

Each of the first touch electrode lines T1 to T5 may be electrically connected to the touch circuit 300 through at least one touch line TL. Each of the second touch electrode lines R1 to R6 may be electrically connected to the touch circuit 300 through at least one touch line TL.

Referring to FIG. 4, for self-capacitance-based touch sensing, the touch screen panel TSP may have multiple touch electrodes TE arranged therein.

A touch driving signal may be applied to each of the multiple touch electrodes TE, and a touch sensing signal may be sensed from each thereof.

Each of the multiple touch electrodes TE may be electrically connected to the touch circuit 300 through at least one touch line TL.

In order to describe the structure of the touch electrodes TE and the touch lines TL, a first touch electrode and a second touch electrode arranged in the same column direction will be described by way of example.

A first touch line connected to the first touch electrode may overlap the second touch electrode, and may be insulated from the second touch electrode in the touch screen panel TSP.

A second touch line connected to the second touch electrode may be insulated from the first touch line in the touch screen panel TSP.

Hereinafter, for convenience of description, consideration is given to a case where the touch display device 100 provides a self-capacitance-based touch sensing scheme and the touch screen panel TSP is designed as illustrated in FIG. 4 for self-capacitance-based touch sensing.

The shape of one touch electrode TE illustrated in FIGS. 3 and 4 is described only by way of example, and thus, one touch electrode TE may be variously designed.

The size of an area in which one touch electrode TE is formed may correspond to that of an area in which one sub-pixel is formed.

Otherwise, as illustrated in FIG. 5, the size of an area in which one touch electrode TE is formed may be larger than that of an area in which one sub-pixel is formed.

In the present example, one touch electrode TE may overlap at least two data lines DL and at least two gate lines GL.

In the arrangement structure of the first and second touch electrodes located in the same column direction among multiple touch electrodes, the first touch electrode overlaps at least two data lines and at least two gate lines, and the second touch electrode overlaps at least two data lines and at least two gate lines.

The at least two data lines which overlap the first touch electrode and the at least two data lines which overlap the second touch electrode may be identical to each other. The at least two gate lines which overlap the first touch electrode and the at least two gate lines which overlap the second touch electrode may be different from each other.

In the arrangement structure of a third touch electrode and a fourth touch electrode located in the same row direction among multiple touch electrodes, the third touch electrode overlaps at least two data lines and at least two gate lines, and the fourth touch electrode overlaps at least two data lines and at least two gate lines.

The at least two data lines which overlap the third touch electrode and the at least two data lines which overlap the fourth touch electrode may be different from each other. The at least two gate lines which overlap the third touch electrode and the at least two gate lines which overlap the fourth touch electrode may be identical to each other.

When the size of an area in which one touch electrode TE is formed is large, the size thereof is formed may correspond to that of an area in which several to several tens of sub-pixels are formed.

The touch screen panel TSP may be of an externally mounted type (which may also be referred to as an "add-on type") in which the same is manufactured separately from the display panel DISP and is coupled to the display panel DISP, or may be of an internally mounted type (which may also also be referred to as an "in-cell or on-cell type") in which the same is mounted within the display panel DISP.

An example in which the touch screen panel TSP is mounted within the display panel DISP implies that the touch electrodes TE and the touch lines TL are mounted therewithin.

As illustrated in FIGS. 3 and 4, the touch circuit 300 may include: at least one touch driving circuit TDC configured to supply a touch driving signal to the touch screen panel TSP and detect (receive) a touch sensing signal from the touch screen panel TSP; a touch controller T-CTR configured to recognize whether there is a touch input, the position of the touch input, and/or the like by using a result of the detection of the touch sensing signal by the touch driving circuit TDC; and the like.

The at least one touch driving circuit TDC and the touch controller T-CTR may be implemented as separate components or one component.

The touch driving circuit TDC, together with the data driving circuit DDC, may be integrated into at least one integral IC SRIC and may be implemented as the at least one integral IC SRIC. That is, the touch display device 100 may include at least one integral IC SRIC, and each integral IC SRIC may include at least one touch driving circuit TDC and at least one data driving circuit DDC (refer to FIG. 19).

As described above, the implementation of integration of the touch driving circuit TDC configured to perform touch driving, and the data driving circuit DDC configured to perform data driving is an internally mounted type in which the touch screen panel TSP is mounted within the display panel DISP, and enables effective execution of touch driving and data driving when the touch lines TL connected to the touch electrodes TE are arranged in parallel to the data lines DL.

When the touch screen panel TSP is of the internally mounted type (e.g., an in-cell or on-cell type) in which the same is mounted within the display panel DISP, the touch electrodes TE may be variously configured.

When the touch display device 100 is implemented as a type of display device such as an LCD device, a touch electrode TE may be a common electrode that generates a electric field with a pixel electrode within each sub-pixel.

As an example, when display driving for image display and touch driving for touch sensing are performed in a time-division manner, touch electrodes TE may be common electrode blocks to/from which, during a touch driving interval, a touch driving signal is applied or touch sensing signals are detected, or to which a common voltage is applied during a display driving interval. During the display driving interval, the touch electrodes TE may all be electrically connected in the touch circuit 300 and may be supplied with a common voltage. During the touch driving interval, some or all of the touch electrodes TE may be selected in the touch circuit 300, and the touch driving circuit TDC of the touch circuit 300 may apply a touch driving signal to the at least one selected touch electrode TE, or may detect a touch sensing signal therefrom.

As another example, when display driving for image display and touch driving for touch sensing are simultaneously performed, a touch driving signal applied to a first touch electrode and a second touch electrode may be not only a voltage which generates a capacitance with a data voltage supplied to each of at least two sub-pixels that overlap the first touch electrode, but may also be a voltage which generates a capacitance with a data voltage supplied to each of at least two sub-pixels that overlap the second touch electrode.

Also, each touch electrode TE may include multiple slits (which may also be referred to as "holes") in order to generate an electric field with pixel electrodes within multiple sub-pixels that each touch electrode TE overlaps.

When the touch display device 100 is implemented by an OLED device, multiple touch electrodes TE and multiple touch lines TL may be arranged on an encapsulation layer in the display panel DISP. In the present example, the encapsulation layer may be disposed on common electrodes (e.g., cathode electrodes) which are arranged on the front surface of the display panel DISP and to which a common voltage is applied.

In the present example, a common electrode arranged on the front surface of the display panel DISP may be, for example, a cathode electrode among an anode electrode (corresponding to a pixel electrode) and a cathode electrode of an OLED within each sub-pixel SP, and a common voltage may be a cathode voltage.

In the present example, each of the multiple touch electrodes TE may be of the type of electrode that does not include an opening portion or open area. Each of the multiple touch electrodes TE may be a transparent electrode for light emission at sub-pixels SP.

Alternatively, each of the multiple touch electrodes TE may be a mesh-type electrode that includes multiple open areas. Each open area of each of the multiple touch electrodes TE may correspond to a light-emitting area (e.g., an area where a part of an anode electrode is located) of a sub-pixel SP.

In the following description, consideration is given to a case in which the touch screen panel TSP is mounted within the display panel DISP. The display panel DISP having the built-in touch screen panel TSP may also be referred to as a "touch display panel".

Figure 6:
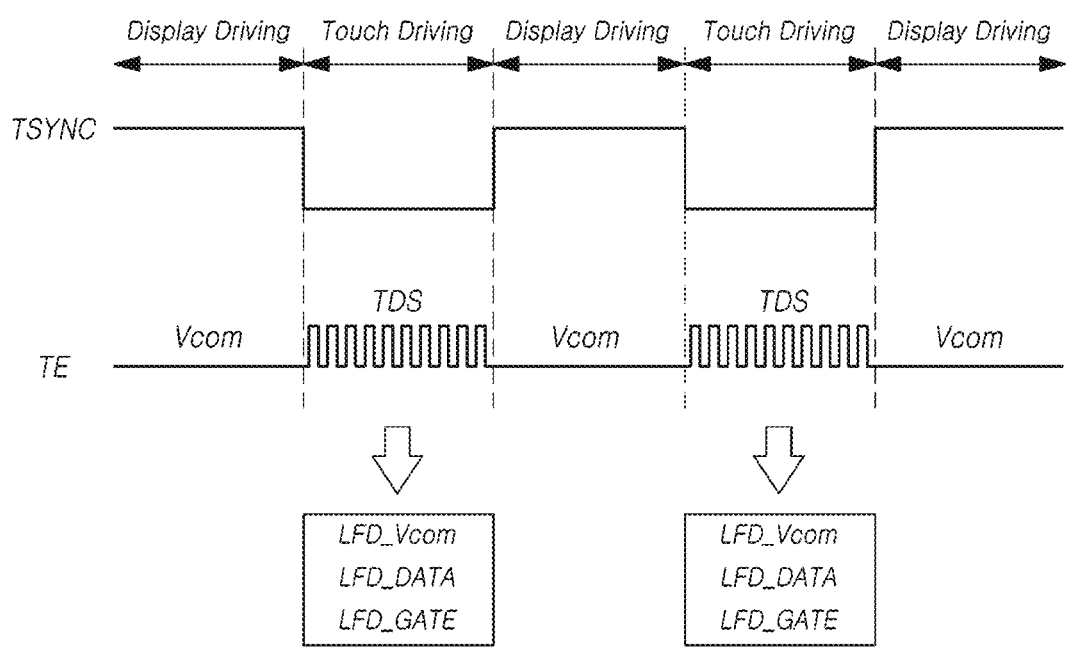
FIG. 6 is a timing diagram illustrating a time-division driving scheme of a touch display device according to embodiments of the present disclosure.

FIG. 6 is a timing diagram illustrating a time-division driving scheme of the touch display device 100 according to embodiments of the present disclosure.

Referring to FIG. 6, the touch display device 100 according to embodiments of the present disclosure may perform display driving and touch driving in a time-division manner. Such a driving scheme is referred to as a "time-division driving scheme".

The touch display device 100 according to embodiments of the present disclosure may use a synchronization signal TSYNC to distinguish a display driving interval from a touch driving interval.

For example, a first level (e.g., a high level) of a synchronization signal TSYNC may indicate a display driving interval, and a second level (e.g., a low level) thereof may indicate a touch driving interval.

During a touch driving interval, a touch driving signal TDS may be applied to all or some of the touch electrodes TE. During a display driving interval, the touch electrodes TE may be floated, may be grounded, or may receive a particular Direct Current (DC) voltage applied thereto.

When the touch electrodes TE also serve as common electrodes for display driving, a common voltage Vcom for display driving may be applied to the touch electrodes TE during a display driving interval, and a touch driving signal TDS may be applied thereto during a touch driving interval.

A touch driving signal TDS applied to the touch electrodes TE during a touch driving interval may be a DC voltage or a signal having a changed voltage level. When a touch driving signal TDS is a signal having a changed voltage level, the same may also be referred to as a "modulation signal", "pulse signal", "Alternating Current (AC) signal", or the like.

During a touch driving interval, while a touch driving signal TDS is applied to the touch electrodes TE that may be common electrodes, the touch electrodes TE may generate a parasitic capacitance with other adjacent electrodes. Such a parasitic capacitance may reduce touch sensitivity.

Accordingly, during a touch driving interval, while applying a touch driving signal TDS to the touch electrodes TE that may be common electrodes, the touch display device 100 may apply a load-free driving signal LFD to other adjacent electrodes of the touch electrodes TE.

A load-free driving signal LFD may be a touch driving signal TDS, or may be a signal having at least one signal characteristic corresponding to that of the touch driving signal TDS among signal characteristics including a frequency, a phase, a voltage polarity, and an amplitude.

Other adjacent electrodes of the touch electrodes TE may be data lines, gate lines, other touch electrodes, or the like, and in addition, may be all electrodes, signal wires, or the like that are located around the touch electrodes TE.

During a touch driving interval, while a touch driving signal TDS is applied to the touch electrodes TE, a load-free driving signal LFD DATA may be applied to at least one data line, located around the touch electrodes TE, or all the data lines in the display panel DISP.

During a touch driving interval, while a touch driving signal TDS is applied to the touch electrodes TE, a load-free driving signal LFD GATE may be applied to at least one gate line, located around the touch electrodes TE, or all the gate lines in the display panel DISP.

During a touch driving interval, while a touch driving signal TDS is applied to the touch electrodes TE, a load-free driving signal LFD Vcom may be applied to at least one touch electrode TE, located around the touch electrodes TE, or all of the remaining touch electrodes TE in the display panel DISP.

When the touch display device 100 according to embodiments of the present disclosure operates using the time-division driving scheme, the touch display device 100 needs to use a display driving interval and a touch driving interval divided from a frame time, and thus may suffer a shortage of a display driving time.

Such a shortage of a display driving time may cause a condition in which a capacitor (e.g., a capacitor between a pixel electrode and a common electrode) for image display cannot be charged as much as required.

When the touch display device 100 according to embodiments of the present disclosure operates using the time-division driving scheme, not only the shortage of a display driving time but also a shortage of a touch driving time may occur, so as to cause degradation of the speed and accuracy of touch sensing.

Also, when the touch display device 100 according to embodiments of the present disclosure operates using the time-division driving scheme, the touch display device 100 is disadvantageous in that a power IC configured to generate a touch driving signal TDS and a load-free driving signal LFD is separately required.

In this regard, the touch display device 100 according to embodiments of the present disclosure operates may simultaneously perform display driving and touch driving by using a driving scheme different from the time-division driving scheme.

In order to simultaneously perform display driving and touch driving, the touch display device 100 according to embodiments of the present disclosure operates needs to perform a driving operation without causing a harmful mutual influence between display driving and touch driving. This configuration will be described in detail below.

Figure 7:
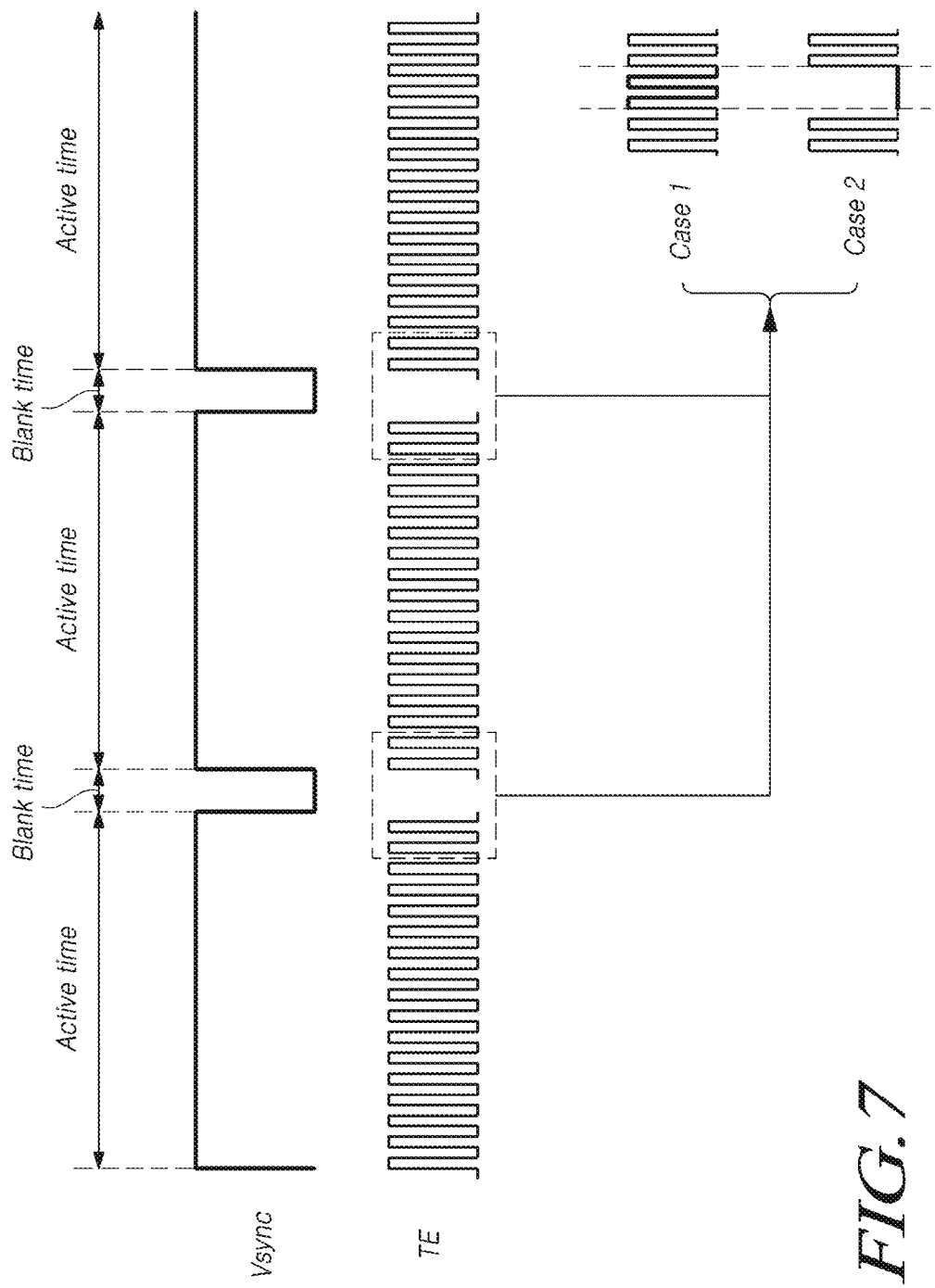
FIG. 7 is a timing diagram illustrating a time-free driving scheme of a touch display device according to embodiments of the present disclosure.

FIG. 7 is a timing diagram illustrating a time-free driving scheme of the touch display device 100 according to embodiments of the present disclosure.

Referring to FIG. 7, the touch display device 100 according to embodiments of the present disclosure may also simultaneously perform display driving and touch driving. Such a driving scheme is referred to as a "Time-Free Driving (TFD) scheme".

In this regard, the touch display device 100 according to embodiments of the present disclosure may not require a synchronization signal TSYNC for distinguishing a display driving interval from a touch driving interval.

When performing TFD, the touch display device 100 according to embodiments of the present disclosure may perform display driving and touch driving for an active time among an active time and a blank time which are defined by a vertical synchronizing signal Vsync. In the present example, one active time may correspond to one display frame time.

Accordingly, when performing TFD, for an active time defined by a vertical synchronizing signal Vsync, the touch display device 100 according to embodiments of the present disclosure: may supply data voltages for image display to data lines DL while sequentially driving multiple gate lines GL, in order to perform display driving; and simultaneously, may supply a touch driving signal TDS to multiple touch electrodes TE in order to perform touch driving.

Therefore, the touch display device 100 according to embodiments of the present disclosure may perform a driving operation by using the TFD scheme, so as to sense a touch made by a finger and/or pen while displaying an image through display driving.

For every frame time (i.e., every active time), the touch display device 100 according to embodiments of the present disclosure may also simultaneously perform display driving and touch driving.

Otherwise, the touch display device 100 according to embodiments of the present disclosure may perform only display driving operations for some frame times (i.e., some active times), may simultaneously perform display driving operations and touch driving operations for some other frame times (i.e., some other active times), and according to the circumstances, may perform only touch driving operations for certain some frame times (i.e., certain some active times).

The touch display device 100 according to embodiments of the present disclosure may supply a touch driving signal TDS having a changed voltage level to the touch electrodes TE for an active time, and may supply a touch driving signal TDS having a changed voltage level to the touch electrodes TE even for a blank time (Case 1).

Otherwise, the touch display device 100 according to embodiments of the present disclosure may float the touch electrodes TE for a blank time, may supply a DC voltage to the touch electrodes TE, or may supply a particular reference voltage (e.g., a ground voltage) to the touch electrodes TE (Case 2). This configuration may ba applied to a case in which a blank time is utilized as a special time for touch driving for a pen and the like.

Figure 8:
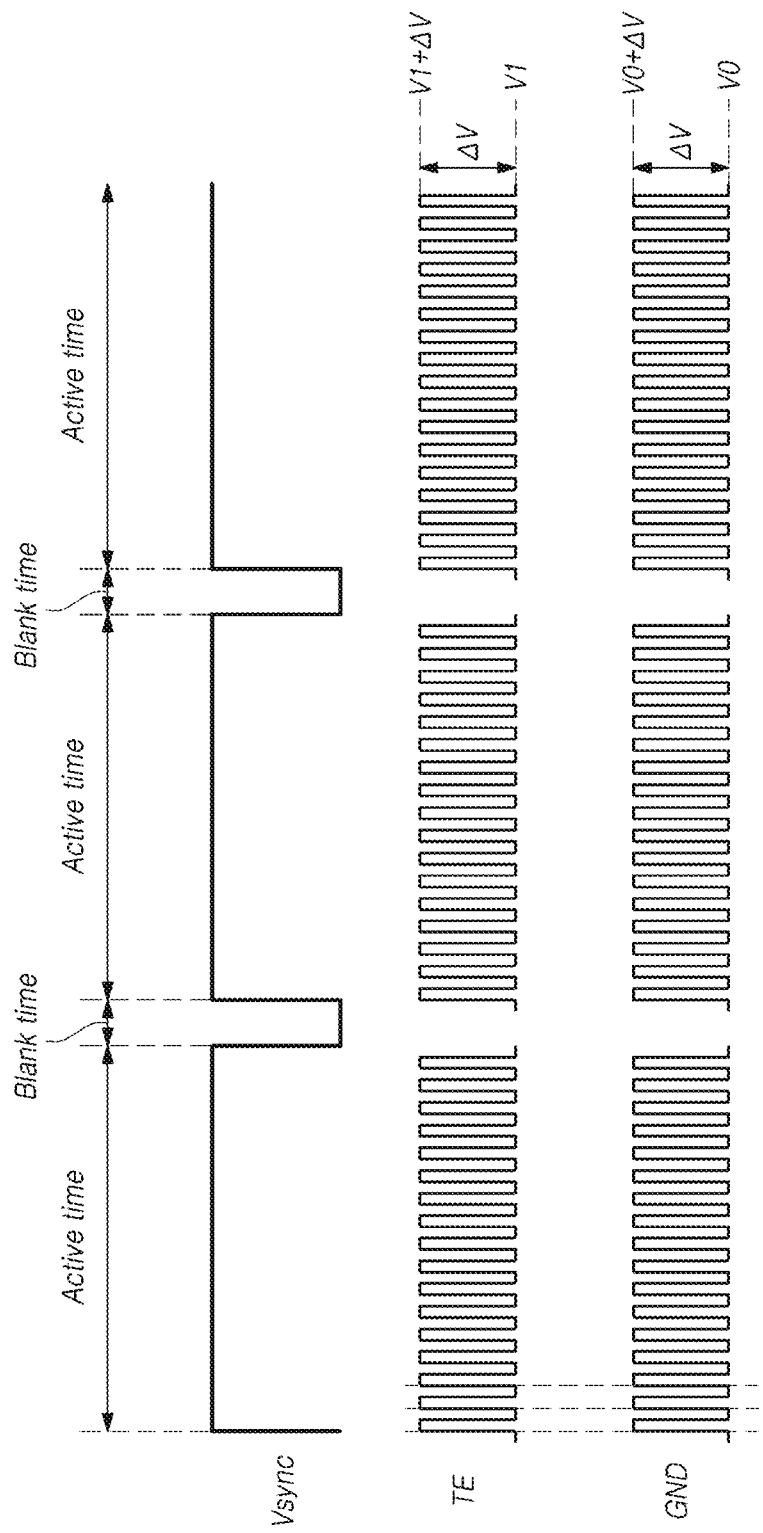
FIG. 8 is a timing diagram illustrating a time-free driving scheme which uses a ground modulation technique and is employed by a touch display device according to embodiments of the present disclosure.

FIG. 8 is a timing diagram illustrating a time-free driving scheme which uses a ground modulation technique and is employed by the touch display device 100 according to embodiments of the present disclosure.

Referring to FIG. 8, when the touch display device 100 according to embodiments of the present disclosure applies a touch driving signal TDS having a changed voltage level to the touch electrodes TE while performing display driving (i.e., for an active time), a ground voltage of a ground GND, to which the display panel DISP is grounded, may have at least one signal characteristic corresponding to that of the touch driving signal TDS among signal characteristics including a frequency, a phase, a voltage polarity, and an amplitude.

Referring to the example illustrated in FIG. 8, while display driving and touch driving are simultaneously performed (i.e., for an active time), a ground voltage of the ground GND, to which the display panel DISP is grounded, may have an amplitude of $\Delta V$ and may have a voltage level which goes up and down between $V0$ and $(V0+\Delta V)$. The touch driving signal TDS applied to the touch electrodes TE may have the amplitude of $\Delta V$ and may have a voltage level which goes up and down between $V1$ and $(V1+\Delta V)$.

Referring to the example illustrated in FIG. 8, a ground voltage of the ground GND, to which the display panel DISP is grounded, may have a frequency, a phase, and an amplitude which are identical to those of the touch driving signal TDS applied to the touch electrodes TE. In this regard, when voltage levels are changed, high-level voltages and low-level voltages may be identical to each other (i.e., $V0=V1$), or may be different from each other (i.e., $V0 \neq V1$).

As illustrated in FIGS. 7 and 8, a vertical synchronizing signal Vsync may maintain a second level (e.g., a high or low level) for an active time, and may maintain a first level (e.g., a low or high level) for a blank time. In the present example, a time period between a pair of the first levels (e.g., low or high levels) may be defined as one display frame.

Otherwise, a vertical synchronizing signal Vsync may maintain a first level (e.g., a low or high level) for an active time, and may maintain a second level (e.g., a high or low level) for a blank time. In the present example, a time period between two pulses having the second level (e.g., a high or low level) may be defined as one display frame.

FIGS. 9 to 12 are block diagrams for explaining a ground modulation technique and a ground modulation circuit GMC of the touch display device 100 according to embodiments of the present disclosure. FIG. 13 is a block diagram illustrating a ground modulation circuit GMC of the touch display device 100 according to embodiments of the present disclosure.

Figure 9:
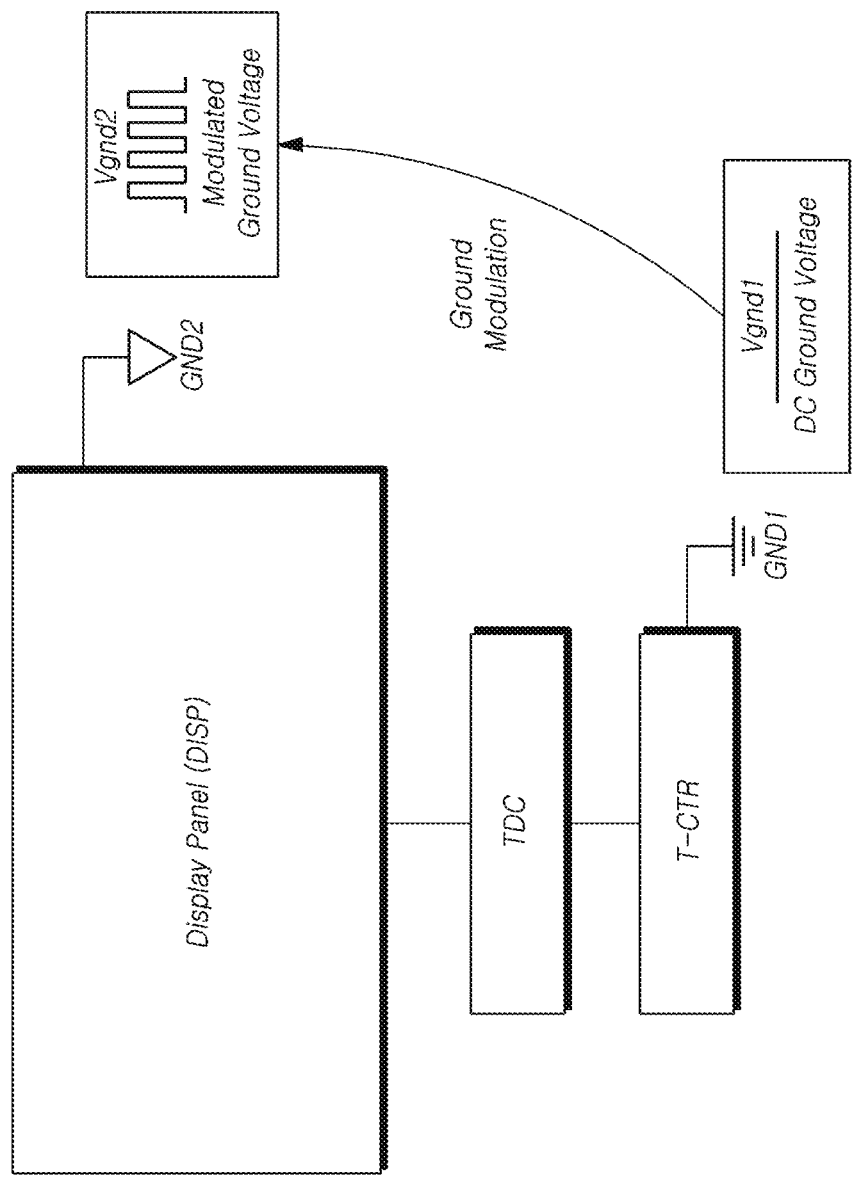
FIGS. 9 to 12 are block diagrams for explaining a ground modulation technique and a ground modulation circuit of a touch display device according to embodiments of the present disclosure.

Referring to FIG. 9, the touch display device 100 according to embodiments of the present disclosure may include: a display panel DISP having multiple data lines DL and multiple gate lines GL arranged therein, having multiple touch electrodes TE arranged therein, and having multiple touch lines TL, which are electrically connected to the multiple touch electrodes TE so as to correspond to the multiple touch electrodes TE, arranged therein; a touch driving circuit TDC configured to drive at least one touch electrode among the multiple touch electrodes TE; a touch controller T-CTR configured to sense whether there is a touch made by at least one of a finger and a pen, or a position of the touch on the basis of touch sensing data received from the touch driving circuit TDC; and the like.

Referring to FIG. 9, the touch controller T-CTR may be grounded to a primary ground GND1. The display panel DISP may be grounded to a secondary ground GND2 different from the primary ground GND1.

For example, the primary ground GND1 may be a ground wire or a ground electrode disposed in the display panel DISP, an external structure such as the outer cover of the display panel DISP, or a wire or an electrode disposed at such an external structure. The secondary ground GND2 may be a ground wire or a ground electrode disposed in the display panel DISP, an external structure such as the outer cover of the display panel DISP, or a wire or an electrode disposed at such an external structure.

Figure 10:
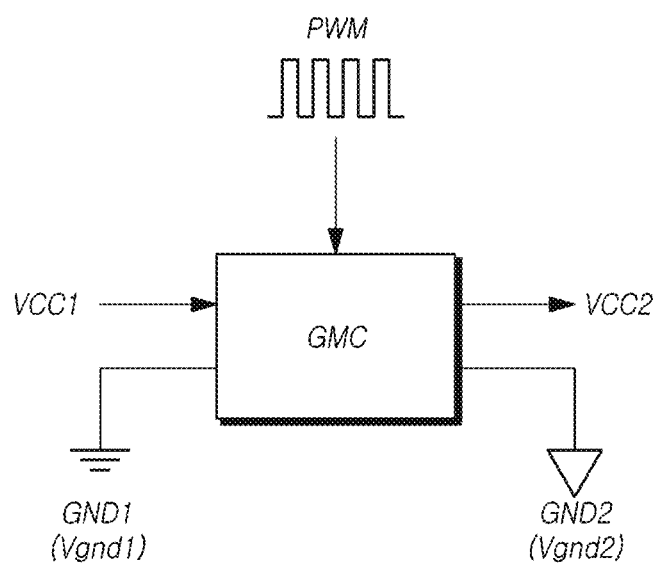

Referring to FIGS. 9 and 10, the touch display device 100 according to embodiments of the present disclosure may further include a ground modulation circuit GMC configured to apply a modulation signal to the primary ground GND1 or the secondary ground GND2 such that one ground voltage among a primary ground voltage Vgnd1 of the primary ground GND1 and a secondary ground voltage Vgnd2 of the secondary ground GND2 becomes a modulated ground voltage as compared with the remaining ground voltage.

Referring to FIG. 9, the secondary ground voltage Vgnd2 of the secondary ground GND2 may be regarded as a modulated ground voltage as compared with the primary ground voltage Vgnd1 of the primary ground GND1. Also, the primary ground voltage Vgnd1 of the primary ground GND1 may also be regarded as a modulated ground voltage as compared with the secondary ground voltage Vgnd2 of the secondary ground GND2.

That is, when the secondary ground voltage Vgnd2 is viewed with reference to the primary ground voltage Vgnd1, the secondary ground voltage Vgnd2 is viewed as a modulated signal (a modulated ground voltage) having a changed voltage level. When the primary ground voltage Vgnd1 is viewed with reference to the secondary ground voltage Vgnd2, the primary ground voltage Vgnd1 is viewed as a modulated signal (a modulated ground voltage) having a changed voltage level.

The display panel DISP may be grounded to the secondary ground GND2 having the secondary ground voltage Vgnd2 of a modulated signal type, so as to swing a touch driving signal TDS applied to the touch electrodes TE arranged in the display panel DISP as in the case of the secondary ground voltage Vgnd2.

As described above, the touch display device 100 may simultaneously and stably perform display driving and touch driving according to the TFD scheme by using two types of grounds GND1 and GND2.

The touch display device 100 may simultaneously perform display driving and touch driving by using the TFD scheme so as to apply data voltages to the multiple data lines DL while applying a touch driving signal TDS to at least one of the multiple touch electrodes TE.

In the present example, among signal characteristics including a frequency, a phase, a voltage polarity, and an amplitude, the touch driving signal TDS applied to the at least one of the multiple touch electrodes TE may have at least one signal characteristic corresponding to that of the secondary ground voltage Vgnd2 of the secondary ground GND2 to which the display panel DISP is grounded.

When the multiple touch electrodes TE are divided common electrodes to which a common voltage used for display driving is applied, the touch driving signal TDS applied to the at least one of the multiple touch electrodes TE may be the common voltage required for display driving.

Figure 11:
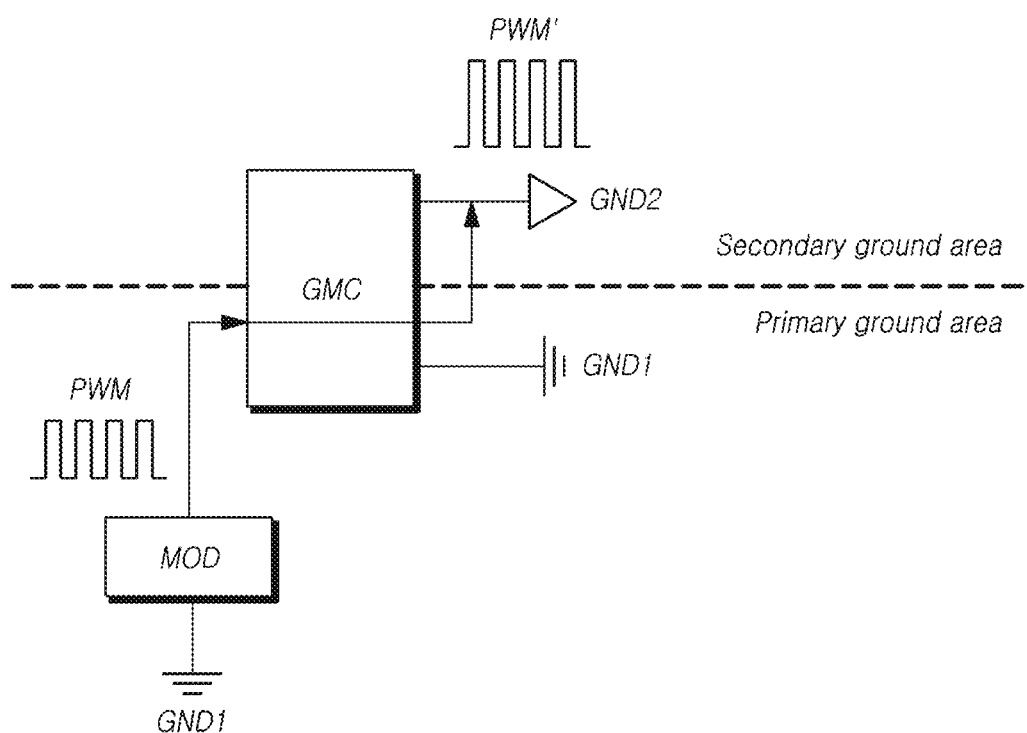
Figure 12:
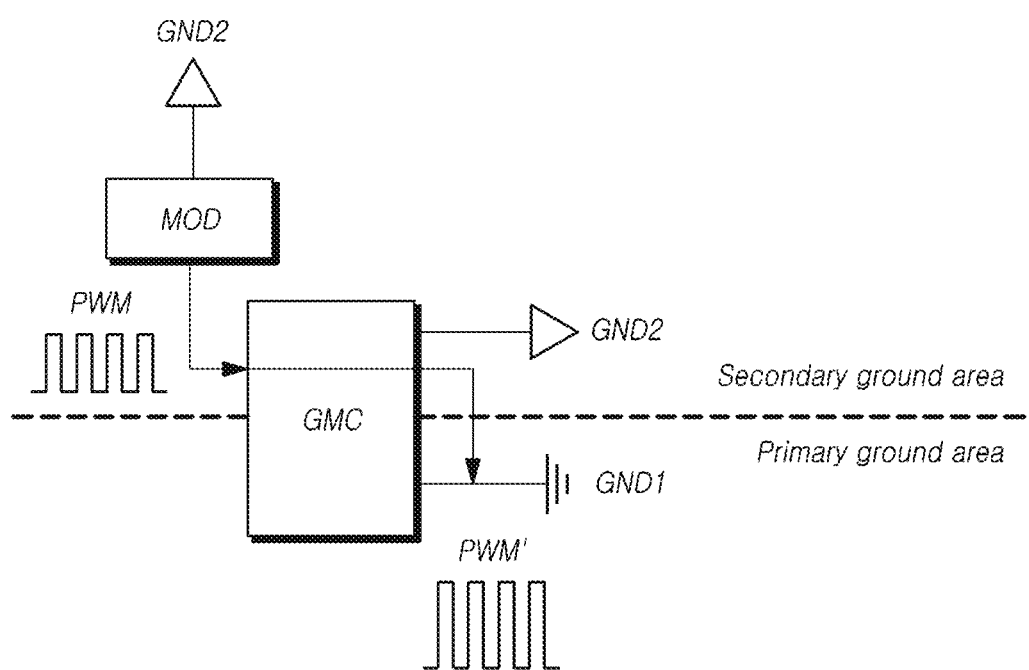
Figure 13:
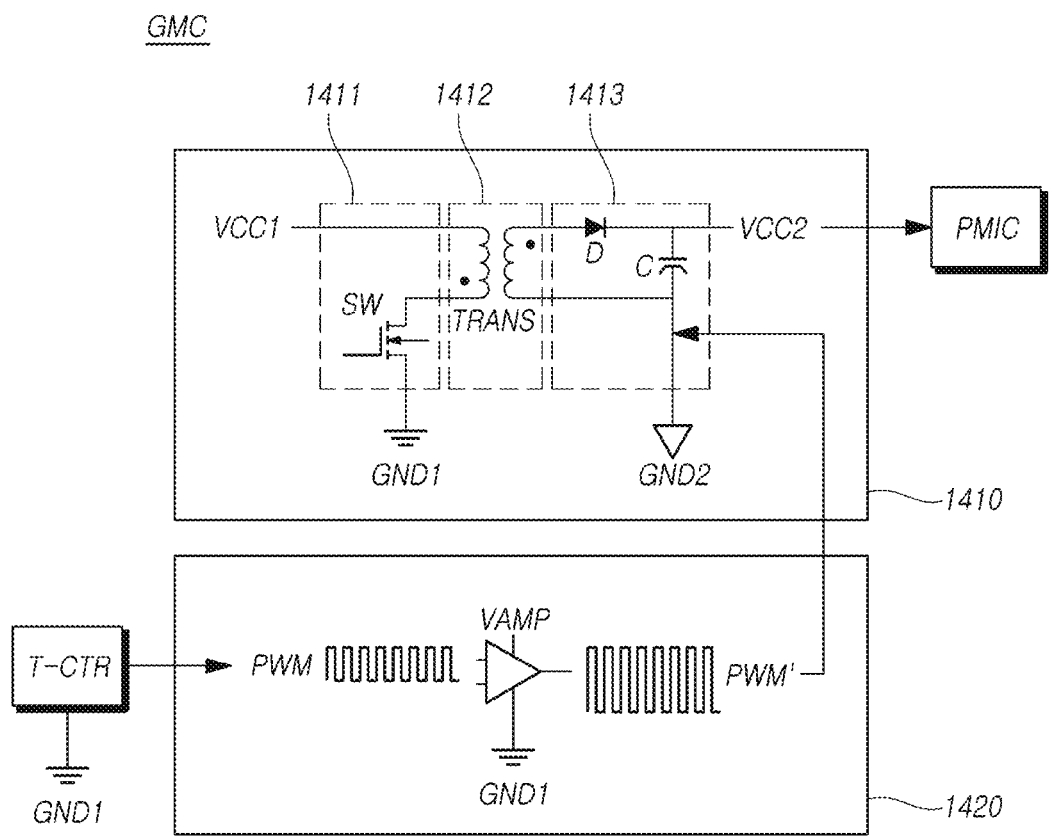
FIG. 13 is a block diagram illustrating a ground modulation circuit of a touch display device according to embodiments of the present disclosure.

Referring to FIGS. 11 and 12, the touch display device 100 may further include a modulator MOD configured to output a reference modulation signal PWM for ground modulation.

A ground modulation circuit GMC may apply, to the primary ground GND1 or the secondary ground GND2, a reference modulation signal (e.g., PWM) output from the modulator MOD or a modulation signal (e.g., PWM') obtained by amplifying the reference modulation signal (e.g., PWM).

Referring to FIG. 11, when the modulator MOD is grounded to the primary ground GND1, the ground modulation circuit GMC may apply, to the secondary ground GND2, a reference modulation signal (e.g., PWM) output from the modulator MOD or a modulation signal (e.g., PWM') obtained by amplifying the reference modulation signal (e.g., PWM).

In the present example, the modulator MOD may be a touch controller T-CTR that is grounded to the primary ground GND1.

Referring to FIG. 12, when the modulator MOD is grounded to the the secondary ground GND2, the ground modulation circuit GMC may apply, to primary ground GND1, a reference modulation signal (e.g., PWM) output from the modulator MOD or a modulation signal (e.g., PWM') obtained by amplifying the reference modulation signal (e.g., PWM).

Accordingly, the touch display device 100 may efficiently perform ground modulation according to the conditions.

Referring to FIG. 13, the ground modulation circuit GMC of the touch display device 100 according to embodiments of the present disclosure may include a power source separation circuit 1410, a voltage modulation circuit 1420, and the like.

The ground modulation circuit GMC may be connected to both the primary ground GND1 and the secondary ground GND2.

The power source separation circuit 1410 is configured to electrically separate the primary ground GND1 from the secondary ground GND2, and may also serve to deliver a power source voltage VCC1 on the side of the primary ground GND1 to the side of the secondary ground GND2.

In such a manner that one ground voltage (e.g., Vgnd1 or Vgnd2) among the primary ground voltage Vgnd1 of the primary ground GND1 and the secondary ground voltage Vgnd2 of the secondary ground GND2 becomes a modulated ground voltage as compared with the remaining ground voltage (e.g., Vgnd2 or Vgnd1), the voltage modulation circuit 1420 may apply, to the primary or secondary ground GND1 or GND2, a reference modulation signal (e.g., PWM) or a modulation signal (e.g., PWM') obtained by amplifying the reference modulation signal (e.g., PWM).

The voltage modulation circuit 1420 may include an amplifier VAMP and the like configured to receive, as input, a reference modulation signal (e.g., PWM) from the modulator MOD illustrated in FIG. 11 or 12, amplify the same, and output an amplified modulation signal (e.g., PWM'). The amplifier VAMP may be implemented by a level shifter and the like.

The amplified modulation signal (e.g., PWM') output from the amplifier VAMP may be applied to the primary or secondary ground GND1 or GND2.

As described above, since the ground modulation circuit GMC includes the power source separation circuit 1410 configured to electrically separate the primary ground GND1 from the secondary ground GND2, even when two types of grounds GND1 and GND2 coexist in the touch display device 100, the touch display device 100 can perform a stable and normal driving operation without causing an abnormal driving operation and the like due to coexistence of two types of grounds GND1 and GND2.

For example, the above-described power source separation circuit 1410 may include at least one of a transformer, a coupled inductor, and a converter.

For example, the converter may include at least one of a flyback converter, a flybuck converter, and a buck-boost converter.

In the example illustrated in FIG. 13, the power source separation circuit 1410 is implemented such that a flyback converter is included therein.

Referring to FIG. 13, the power source separation circuit 1410 may include: an input unit 1411 connected to the primary ground GND1 and configured to receive, as input, a primary-side power source voltage (e.g., VCC1); a delivery unit 1412 configured to maintain or convert the level of the primary-side power source voltage (e.g., VCC1) and output the maintained or converted level thereof; an output unit 1413 connected to the secondary ground GND2 and configured to output a secondary-side power source voltage VCC2 output from the delivery unit 1412; and the like.

The delivery unit 1412 may include a transformer TRANS having a primary coil and a secondary coil that are wound in a predetermined winding ratio.

The input unit 1411 is connected to the primary coil of the transformer TRANS.

The input unit 1411 may input a power source voltage (e.g., VCC1) to one terminal of the primary coil of the transformer TRANS, and may connect the primary ground GND1 to the other terminal of the primary coil thereof.

The input unit 1411 may include a switch SW configured to control a connection between the other terminal of the primary coil of the transformer TRANS and the primary ground GND1.

The output unit 1413 is connected to the secondary coil of the transformer TRANS.

The output unit 1413 may include: a diode D connected between one terminal of the secondary coil of the transformer TRANS and an output node of the secondary-side power source voltage VCC2; a capacitor C connected between the output node of the secondary-side power source voltage VCC2 and the other terminal of the secondary coil of the transformer TRANS; and the like.

In the output unit 1413, a node connected to the other terminal of the secondary coil of the transformer TRANS (or the other terminal of the secondary coil of the transformer TRANS) is connected to the secondary ground GND2.

In the power source separation circuit 1410, the input unit 1411 and the output unit 1413 may be insulated from each other by the delivery unit 1412.

A modulation signal (e.g., PWM') output from the voltage modulation circuit 1420 may be applied to the primary ground GND1, connected to the input unit 1411, or the secondary ground GND2 connected to the output unit 1413.

In the example illustrated in FIG. 13, a touch controller T-CTR corresponding to the modulator MOD is grounded to the primary ground GND1 as in FIG. 11, and thus, a modulation signal (e.g., PWM') output from the voltage modulation circuit 1420 may be applied to the secondary ground GND2 connected to the output unit 1413.

Figure 14:
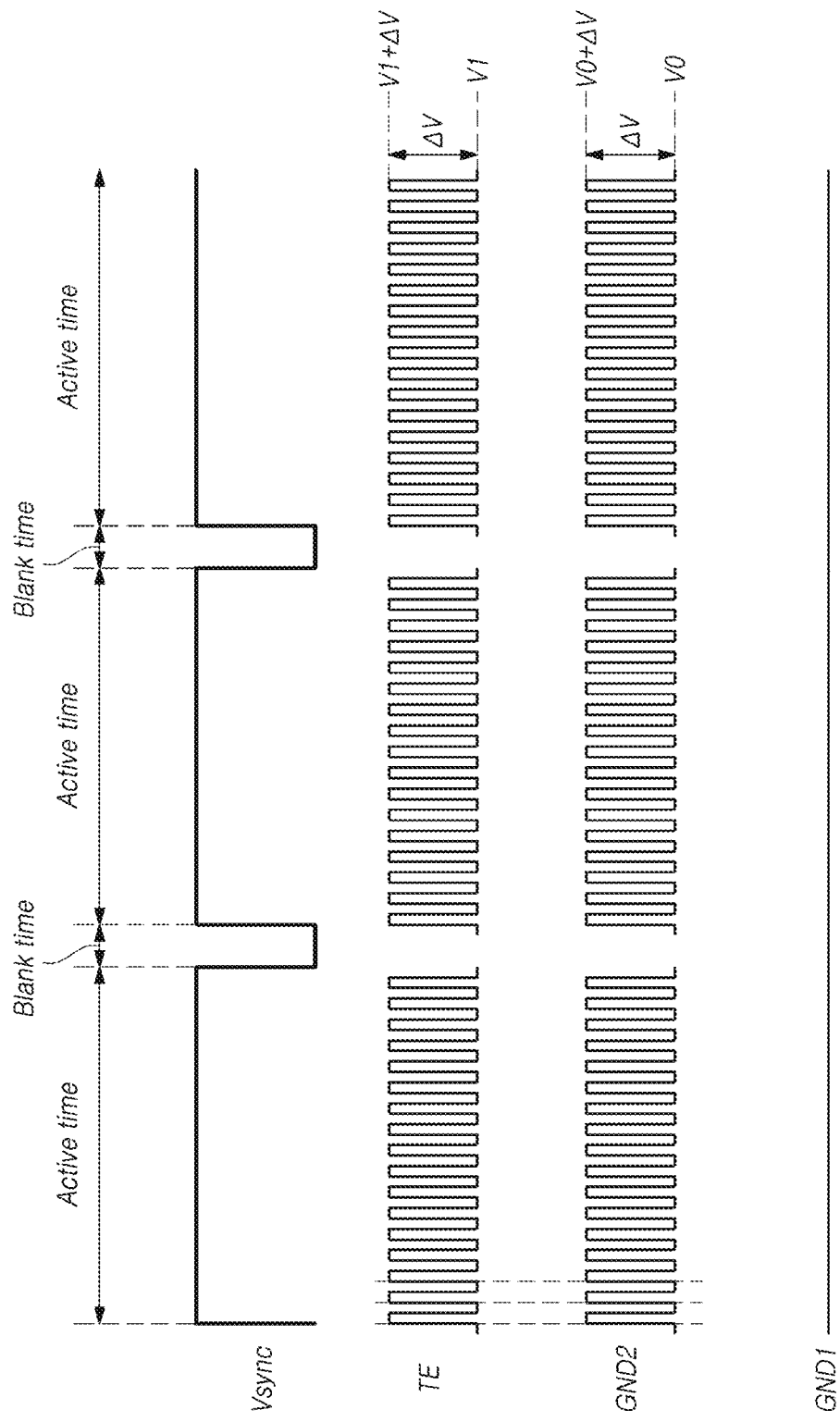
FIG. 14 is a timing diagram illustrating a touch driving signal, a primary ground voltage, and a secondary ground voltage with reference to a primary ground in a touch display device according to embodiments of the present disclosure.

FIG. 14 is a timing diagram illustrating a touch driving signal TDS, a primary ground voltage Vgnd1, and a secondary ground voltage Vgnd2 when viewed with reference to the primary ground GND1 in the touch display device 100 according to embodiments of the present disclosure.

Referring to FIG. 14, when viewed with reference to the primary ground GND1, the primary ground voltage Vgnd1 is a DC ground voltage, and each of the touch driving signal TDS and the secondary ground voltage Vgnd2 may be viewed as a signal having a changed voltage level (a modulated signal) when compared with the primary ground voltage Vgnd1.

That is, with reference to the primary ground voltage Vgnd1, the secondary ground voltage Vgnd2 and the touch driving signal TDS applied to touch electrodes may be modulated signals. In the present example, among signal characteristics including a frequency, a phase, a voltage polarity, and an amplitude, the secondary ground voltage Vgnd2 may have at least one signal characteristic identical or similar to that of the touch driving signal TDS.

Also, with reference to the primary ground voltage Vgnd1, the secondary ground voltage Vgnd2 and a data voltage applied to each of data lines may be modulated signals. In the present example, among signal characteristics including a frequency, a phase, a voltage polarity, and an amplitude, the secondary ground voltage Vgnd2 may have at least one signal characteristic identical or similar to that of the data voltage.

When viewed with reference to the secondary ground GND2, the primary ground voltage Vgnd1 may be viewed as a signal having a changed voltage level (a modulated signal). However, the secondary ground voltage Vgnd2 and the touch driving signal TDS may appear to be DC ground voltages.

Accordingly, since a data voltage applied to each of the data lines DL of the display panel DISP and a touch driving signal applied to the touch electrodes TE thereof correspond to the secondary ground voltage Vgnd2 of the secondary ground GND2 to which the display panel DISP is grounded, display driving and touch driving may be simultaneously performed.

Figure 15:
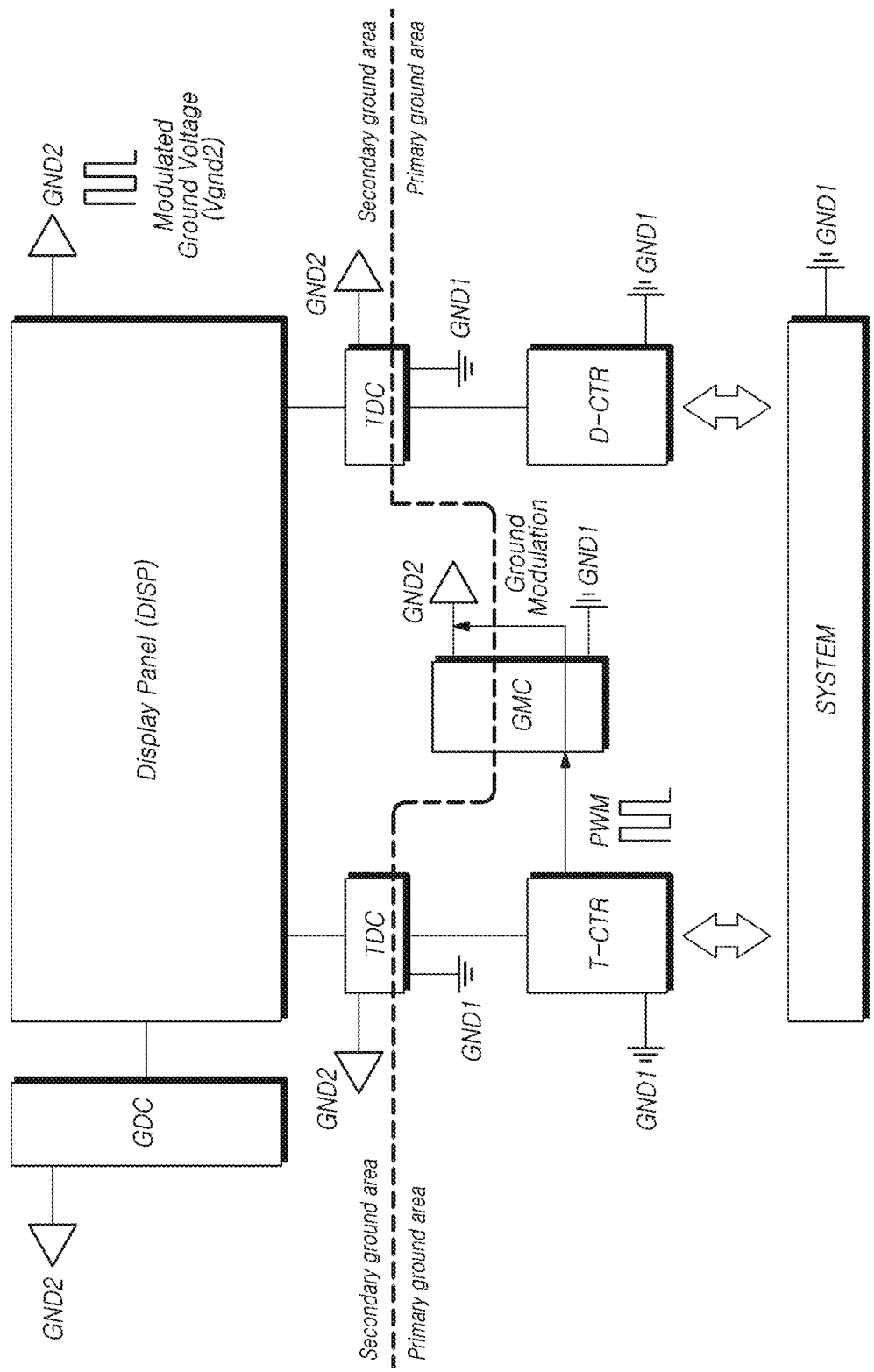
FIG. 15 is a block diagram illustrating an example of ground earth states of main components of a touch display device according to embodiments of the present disclosure.

FIG. 15 is a block diagram illustrating an example of ground earth states of main components of the touch display device 100 according to embodiments of the present disclosure.

Referring to FIG. 15, a display controller D-CTR configured to control a data driving circuit DDC and a gate driving circuit GDC may be components that are grounded to a primary ground GND1.

Accordingly, the display controller D-CTR may perform a stable control operation.

The data driving circuit DDC configured to drive multiple data lines DL and the gate driving circuit GDC configured to drive multiple gate lines GL may be grounded to the secondary ground GND2, and may be further grounded to the primary ground GND1.

Also, as described above, the touch controller T-CTR may be grounded to the primary ground GND1. A ground modulation circuit GMC may be grounded to both of the primary ground GND1 and the secondary ground GND2.

The display controller D-CTR and the touch controller T-CTR may communicate with a system System of the touch display device 100. The system System may include a main board, a power apparatus, and various types of electronic apparatuses.

The system System may be grounded to the primary ground GND1 which may be a system ground.

Figure 16:
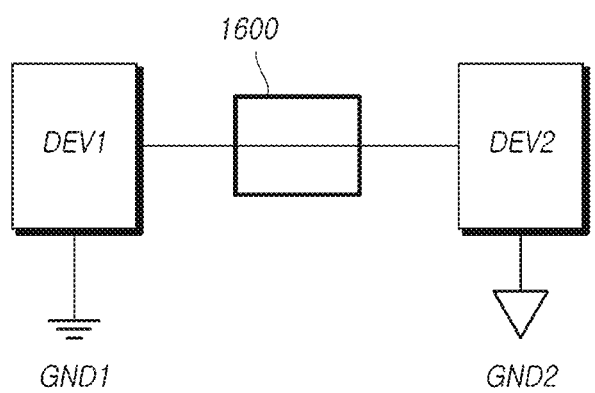
FIGS. 16 to 18 are block diagrams each illustrating a signal delivery circuit between differently-grounded components in a touch display device according to embodiments of the present disclosure.
Figure 17:
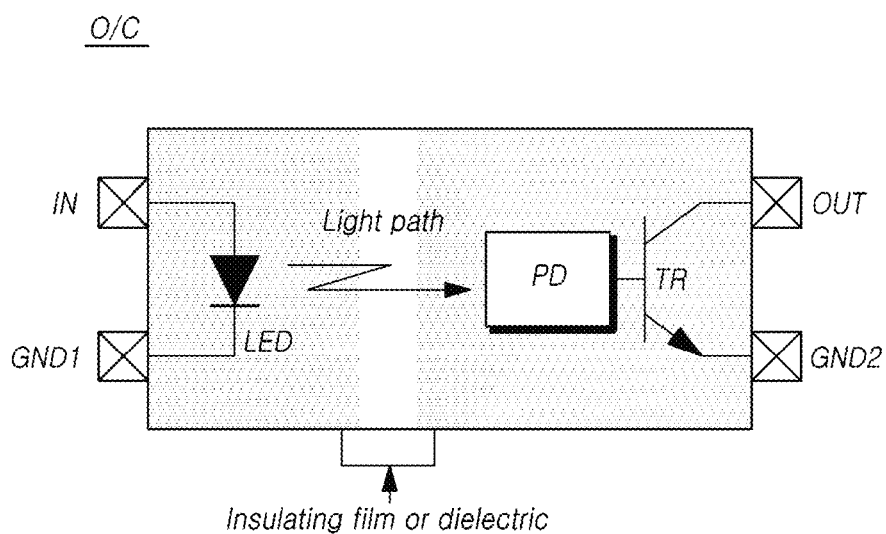
Figure 18:
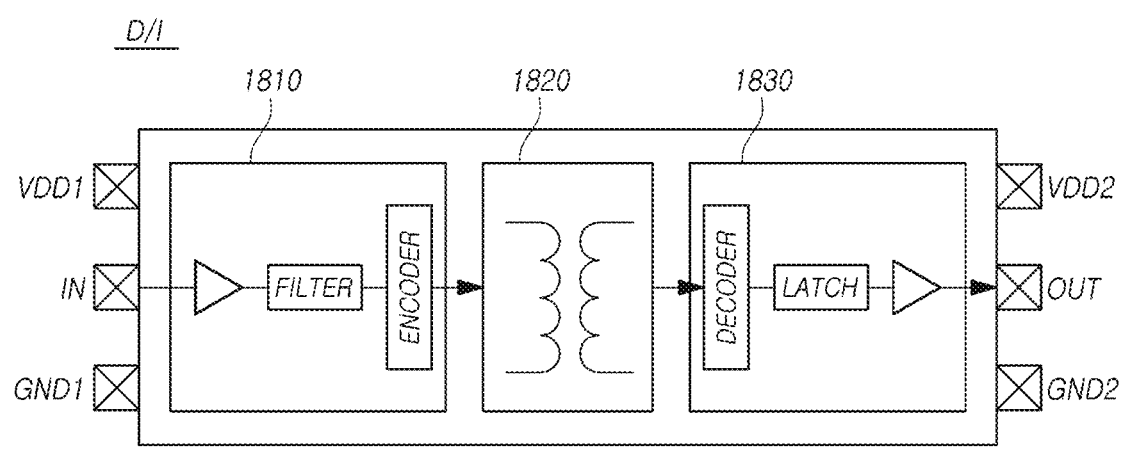

FIGS. 16 to 18 are block diagrams each illustrating a signal delivery circuit 1600 between differently-grounded components in the touch display device 100 according to embodiments of the present disclosure.

Referring to FIG. 16, the touch display device 100 according to embodiments of the present disclosure has two types of grounds GND1 and GND2.

Accordingly, the touch display device 100 according to embodiments of the present disclosure may further include the signal delivery circuit 1600 configured to deliver a signal between a component DEV1 grounded to the primary ground GND1 and a component DEV2 grounded to the secondary ground GND2.

Examples of the component DEV1 grounded to the primary ground GND1 may include a display controller D-CTR, a touch controller T-CTR, a system System, and the like.

Examples of the component DEV2 grounded to the secondary ground GND2 may include a data driving circuit DDC, a gate driving circuit GDC, a touch driving circuit TDC, a level shifter L/S, a digital-to-analog converter DAC, a power management IC PMIC, a display panel DISP, and the like.

For example, as illustrated in FIGS. 17 and 18, the signal delivery circuit 1600 may be implemented by an opto-coupler O/C, a digital isolator D/I, or the like.

Referring to FIG. 17, the opto-coupler O/C may include: an input terminal configured to receive, as an input signal IN, a signal to be delivered; a light-emitting diode LED connected between the input terminal and a primary ground terminal connected to the primary ground GND1; a photo-detector PD configured to detect light emitted from the light-emitting diode LED; and a photo transistor TR configured to be turned on or off according to whether the gate thereof receives a detection result signal from the photo-detector PD. In the present example, the photo-detector PD may be implemented by a photo-diode and the like.

An output signal OUT is output through the drain (or source) of the photo transistor TR, and the source (or drain) thereof may be connected to the secondary ground GND2.

The opto-coupler O/C may include an insulating film or a dielectric disposed on an optical path between the light-emitting diode LED and the the photo-detector PD.

Referring to FIG. 18, the digital isolator D/I may include an input side 1810, a delivery side 1820, and an output side 1830.

The input side 1810 may be configured to receive an input signal IN and an operating power source voltage VDD1, may be connected to the primary ground GND1, and may include a filter, an encoder, and the like.

The delivery side 1820 may be configured to deliver the input signal IN, which is output from the encoder, to the output side 1830, and may be implemented by a transformer and the like.

The output side 1830 may be configured to output an output signal OUT and receive an operating power source voltage VDD2 applied thereto, may be connected to the secondary ground GND2, and may include: a decoder configured to decode a signal output from the delivery side 1820; a latch configured to store the decoded signal; and the like.

In FIGS. 16 and 17, an input signal IN may be a signal received as input from the component DEV1 grounded to the primary ground GND1. An output signal OUT may be a signal which is output from the component DEV2 grounded to the secondary ground GND2.

FIGS. 16 and 17 illustrate an example of the signal delivery circuit 1600 configured to deliver a signal from the component DEV1 grounded to the primary ground GND1 to the component DEV2 grounded to the secondary ground GND2.

In contrast, in the signal delivery circuit 1600 configured to deliver a signal from the component DEV2 grounded to the secondary ground GND2 to the component DEV1 grounded to the primary ground GND1, the primary ground GND1 may be connected to the output side, and the secondary ground GND2 may be connected to the input side.

Referring to FIG. 15, the data driving circuit DDC may be grounded to the secondary ground GND2.

The touch display device 100 according to embodiments of the present disclosure may further include a signal delivery circuit 1600 configured to deliver a signal between the data driving circuit DDC and the display controller D-CTR.

The signal delivery circuit 1600 may be included in one of the data driving circuit DDC and the display controller D-CTR, or may be disposed between the data driving circuit DDC and the display controller D-CTR.

When the signal delivery circuit 1600 is included in the data driving circuit DDC, the data driving circuit DDC may be grounded to both of the primary ground GND1 and the secondary ground GND2.

When the signal delivery circuit 1600 is included in the display controller D-CTR, the display controller D-CTR may be grounded to both of the primary ground GND1 and the secondary ground GND2.

Accordingly, it is possible to deliver a signal between the data driving circuit DDC and the display controller D-CTR that are differently-grounded components.

Referring to FIG. 15, the gate driving circuit GDC may be grounded to the secondary ground GND2.

The touch display device 100 according to embodiments of the present disclosure may further include a signal delivery circuit 1600 configured to deliver a signal between the gate driving circuit GDC and the display controller D-CTR.

The signal delivery circuit 1600 may be included in one of the gate driving circuit GDC and the display controller D-CTR, or may be disposed between the gate driving circuit GDC and the display controller D-CTR.

Accordingly, it is possible to deliver a signal between the gate driving circuit GDC and the display controller D-CTR that are differently-grounded components.

Referring to FIG. 15, the touch driving circuit TDC may be grounded to the secondary ground GND2.

The touch display device 100 according to embodiments of the present disclosure may further include a signal delivery circuit 1600 configured to deliver a signal between the touch driving circuit TDC and the touch controller T-CTR.

The signal delivery circuit 1600 may be included in one of the touch driving circuit TDC and the touch controller T-CTR, or may be disposed between the touch driving circuit TDC and the touch controller T-CTR.

When the signal delivery circuit 1600 is included in the touch driving circuit TDC, the touch driving circuit TDC may be grounded to both of the primary ground GND1 and the secondary ground GND2.

When the signal delivery circuit 1600 is included in the touch controller T-CTR, the touch controller T-CTR may be grounded to both of the primary ground GND1 and the secondary ground GND2.

Accordingly, it is possible to deliver a signal between the touch driving circuit TDC and the touch controller T-CTR that are differently-grounded components.

Figure 19:
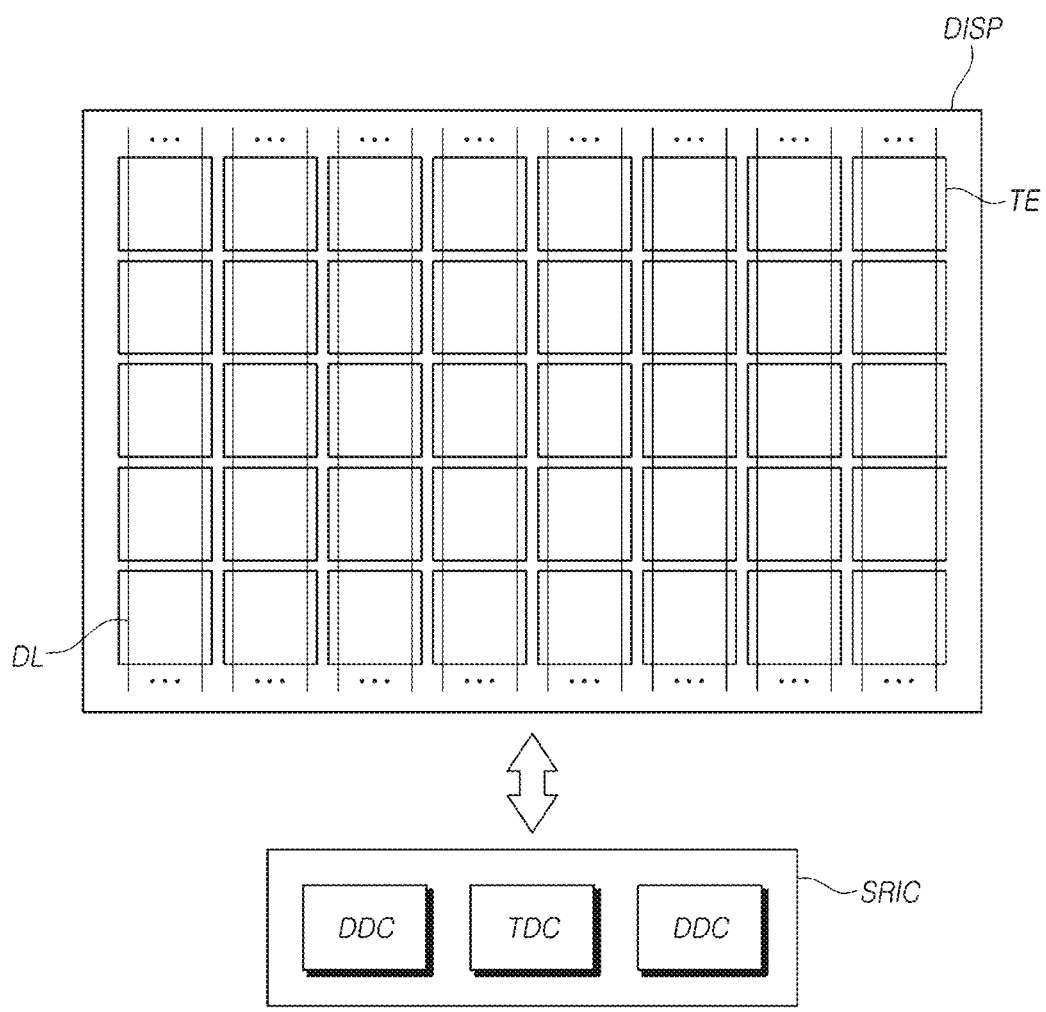
FIG. 19 is a block diagram illustrating a driving integrated circuit having a data driving circuit and a touch driving circuit integrated therein in a touch display device according to embodiments of the present disclosure.

FIG. 19 is a block diagram illustrating a driving IC SRIC having the data driving circuit DDC and the touch driving circuit TDC integrated therein in the touch display device 100 according to embodiments of the present disclosure.

The data driving circuit DDC and the touch driving circuit TDC may be implemented as separate driving ICs.

Otherwise, as illustrated in FIG. 19, the data driving circuit DDC and the touch driving circuit TDC may be included in one driving IC SRIC.

That is, the touch display device 100 according to embodiments of the present disclosure may include at least one driving IC SRIC.

Each of the at least one driving IC SRIC may include at least one data driving circuit DDC and at least one touch driving circuit TDC.

In order to drive the display panel DISP grounded to the secondary ground GND2, each of the at least one driving IC SRIC may be grounded to the secondary ground GND2, and may also be grounded to the primary ground GND1 when a signal delivery circuit 1600 is further included therein.

Figure 20:
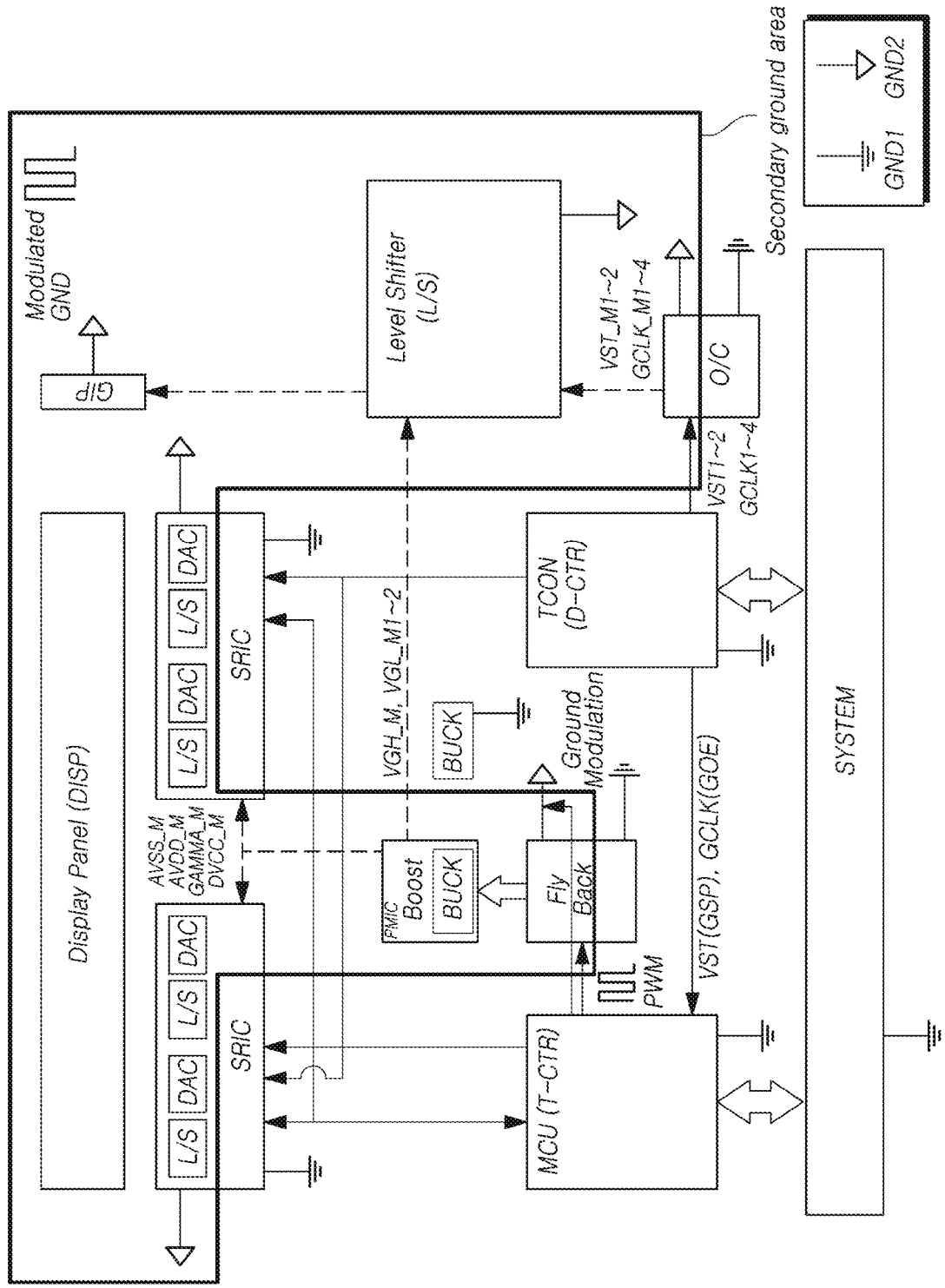
FIG. 20 is a block diagram more specifically illustrating ground earth states of main components of a touch display device according to embodiments of the present disclosure.
Figure 21:
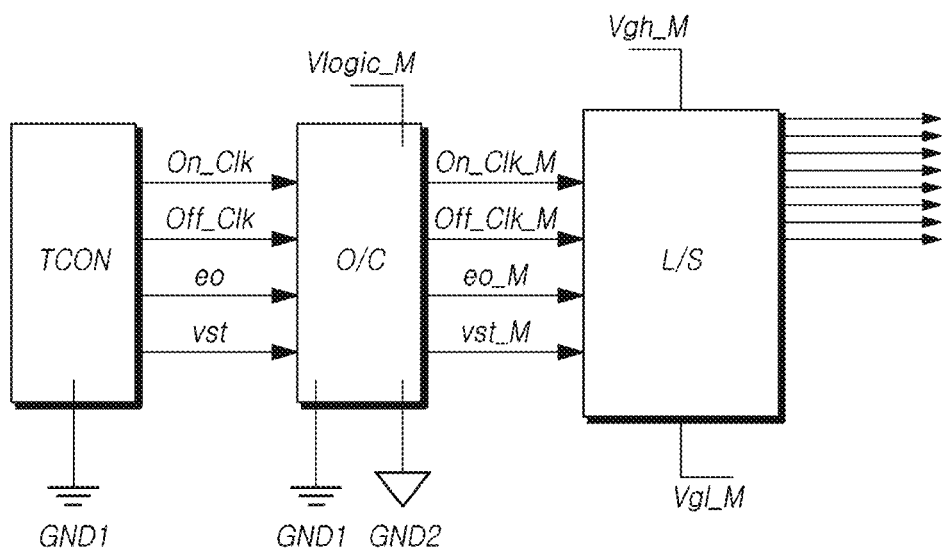
FIG. 21 is a block diagram illustrating a signal delivery structure between a timing controller, corresponding to a display controller, and a level shifter in a touch display device according to embodiments of the present disclosure.
Figure 22:
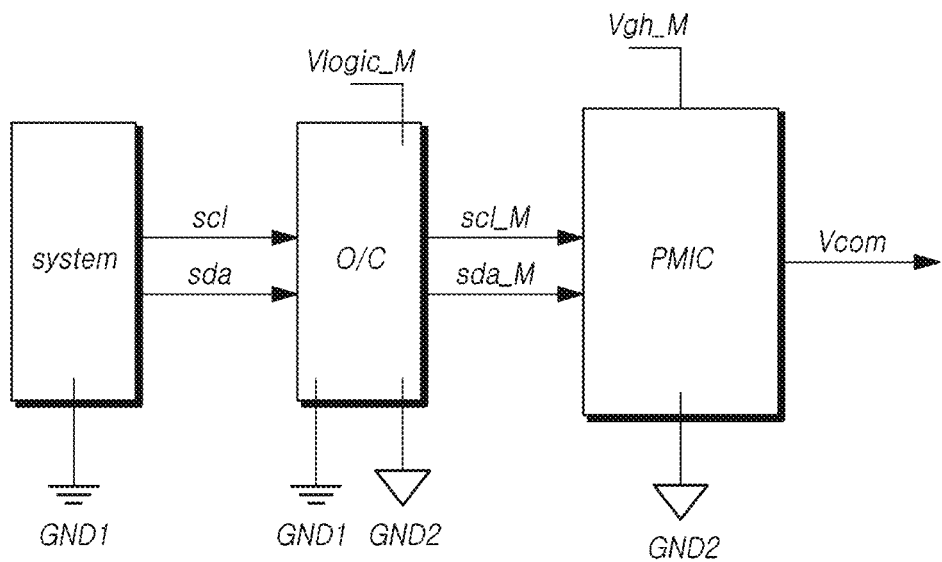
FIG. 22 is a block diagram illustrating a signal delivery structure between a system and a power management integrated circuit in a touch display device according to embodiments of the present disclosure.

FIG. 20 is a block diagram more specifically illustrating FIG. 15 and more specifically illustrating ground earth states of main components of the touch display device 100 including a gate driving circuit GDC implemented as a Gate-In-Panel (GIP)-type and including two integral driving ICs SRIC. FIG. 21 is a block diagram illustrating a signal delivery structure between a timing controller ICON, corresponding to a display controller D-CTR, and a level shifter L/S in the touch display device 100 according to embodiments of the present disclosure. FIG. 22 is a block diagram illustrating a signal delivery structure between the system System and the power management IC PMIC in the touch display device 100 according to embodiments of the present disclosure.

In various signal notations of FIG. 20, "_M" denotes that a signal is of a modulation signal type.

Referring to FIG. 20, the two integral driving ICs SRIC may be grounded to both of the primary ground GND1 and the secondary ground GND2.

The power management IC PMIC may include a buck/boost circuit, and may supply the two integral driving ICs SRIC with modulation signals AVSS_M, AVDD_M, GAMMA_M, and DVCC_M, such as a panel application voltage and a logic power source.

In an example of the touch display device 100 illustrated in FIG. 20, the ground modulation circuit GMC is implemented by a flyback converter, the touch controller T-CTR is implemented by a micro-control unit MCU, and the display controller D-CTR is implemented by a timing controller ICON.

Also, in the example of the touch display device 100 illustrated in FIG. 20, an opto-coupler O/C is used as the signal delivery circuit 1600 in order to deliver a signal between the timing controller ICON and the level shifter L/S.

Referring to FIG. 21, the opto-coupler O/C, which is configured to deliver a signal between the timing controller ICON and the level shifter L/S, may receive a modulated logic voltage Vlogic_M as input, and may be grounded to the primary ground GND1 and the secondary ground GND2.

The opto-coupler O/C converts signals (e.g., VST1 and VST2, GCLK1 to GCLK4, an on-clock signal On_clk, an off-clock signal Off_clk, an even/odd number driving control signal eo, and Vst) output from the timing controller ICON so as to be available for the side of the secondary ground GND2, and outputs, to the level shifter L/S, the converted signals (e.g., VET_M1 and VST_M2, GCLK_M1 to GCLK_M4, a modulated on-clock signal On_clk_M, a modulated off-clock signal Off_clk_M, a modulated even/odd number driving control signal eo_M, and Vst_M).

The level shifter L/S receives, as input, a modulated gate high voltage Vgh_M and a modulated gate low voltage Vgl_M.

The level shifter L/S: may level-shift signals (e.g., VST_M1 and VST_M2, and GCLK_M1 to GCLK_M4) delivered by the opto-coupler O/C, and gate voltages (VGH_M, and VGL_M1 and VGL_M2) delivered by the power management IC PMIC; and may deliver the level-shifted signals to the GIP-type gate driving circuit GDC.

The timing controller TCON may supply the micro-control unit MCU with control signals (e.g., VST(GSP) and GCLK(GOE)).

Referring to FIG. 22, an opto-coupler O/C may be used as the signal delivery circuit 1600 configured to deliver a signal between the system grounded to the primary ground GND1 and the power management IC PMIC grounded to the secondary ground GND2.

The opto-coupler O/C may receive, as input, a modulated logic voltage Vlogic_M and may be grounded to the primary ground GND1 and the secondary ground GND2.

The opto-coupler O/C may receive, as input, a system clock scl and system data sdata from the system, and may output a modulated system clock scl_M and modulated system data sdata_M to the power management IC PMIC.

Accordingly, the power management IC PMIC may output a common voltage Vcom. In the present example, a common voltage Vcom may be used as a touch driving signal TDS applied to touch electrodes TE.

Figure 23:
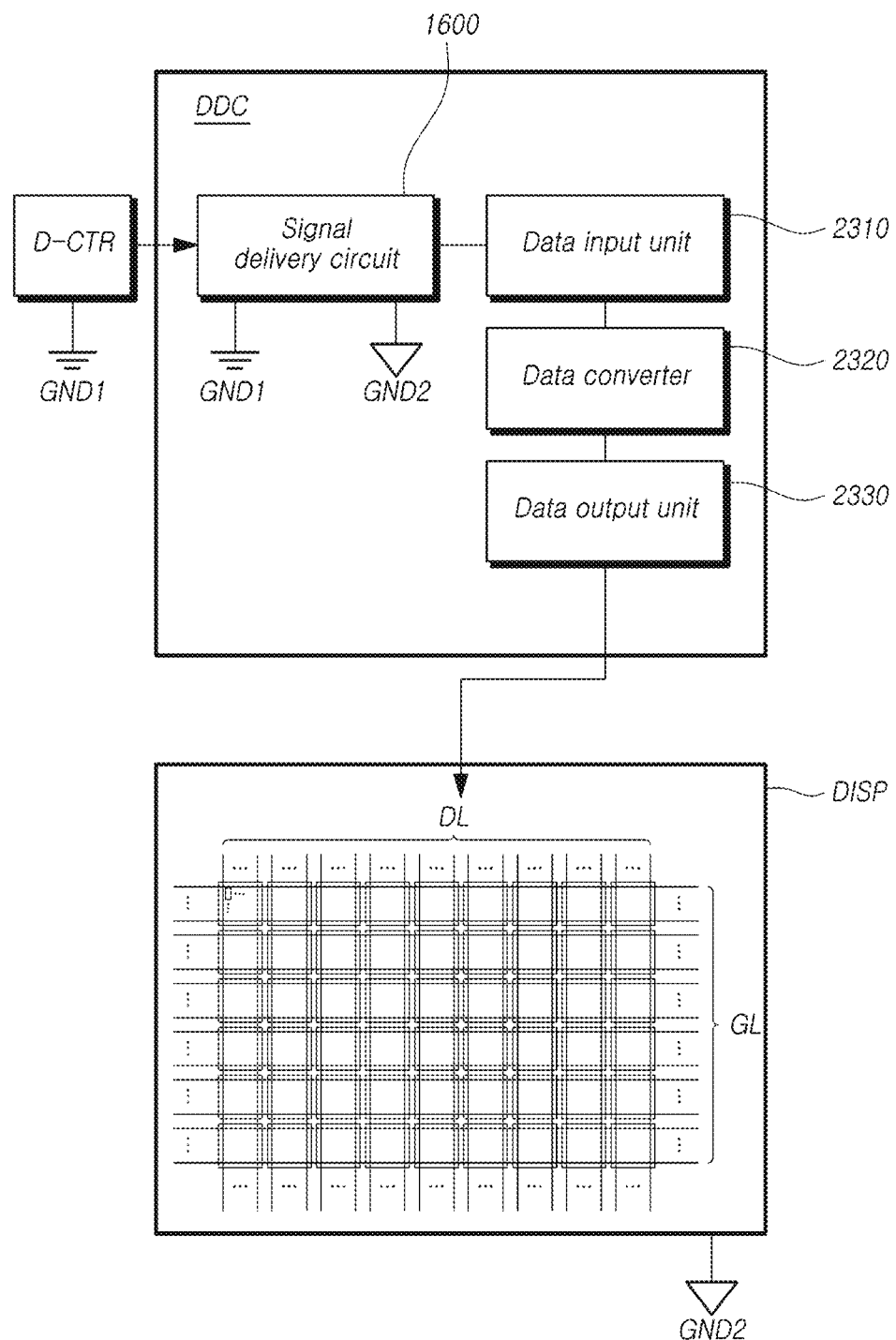
FIG. 23 is a block diagram illustrating a data driving circuit of a touch display device according to embodiments of the present disclosure.

FIG. 23 is a block diagram illustrating the data driving circuit DDC of the touch display device 100 according to embodiments of the present disclosure.

The data driving circuit DDC of the touch display device 100 according to embodiments of the present disclosure is a display driving circuit configured to drive the multiple data lines DL arranged in the display panel DISP.

The data driving circuit DDC according to embodiments of the present disclosure may include: a data input unit 2310 configured to receive, as input, image data from a display controller D-CTR; a data converter 2320 configured to convert the image data into data voltages corresponding to analog voltages; a data output unit 2330 configured to output the data voltages to data lines DL; and and the like.

The data input unit 2310 may include at least one or two latches and the like.

The data converter 2320 may include at least one or two digital-to-analog converters DAC.

The data output unit 2330 may include at least one or two output buffers and the like.

The data input unit 2310 may configured to receive image data from the display controller D-CTR grounded to the primary ground GND1.

The data output unit 2330 may configured to output data voltages to the data lines DL arranged in the display panel DISP grounded to the secondary ground GND2 different from the primary ground GND1.

The data driving circuit DDC according to embodiments of the present disclosure may further include a signal delivery circuit 1600 configured to deliver a signal between the data driving circuit DDC and the display controller D-CTR.

In the present example, the signal delivery circuit 1600 included in the data driving circuit DDC according to embodiments of the present disclosure may be grounded to both of the primary ground GND1 and the secondary ground GND2.

Under the control of the display controller D-CTR grounded to the primary ground GND1, the data lines DL, which are arranged in the display panel DISP grounded to the secondary ground GND2, may be driven using the data driving circuit DDC.

Figure 24:
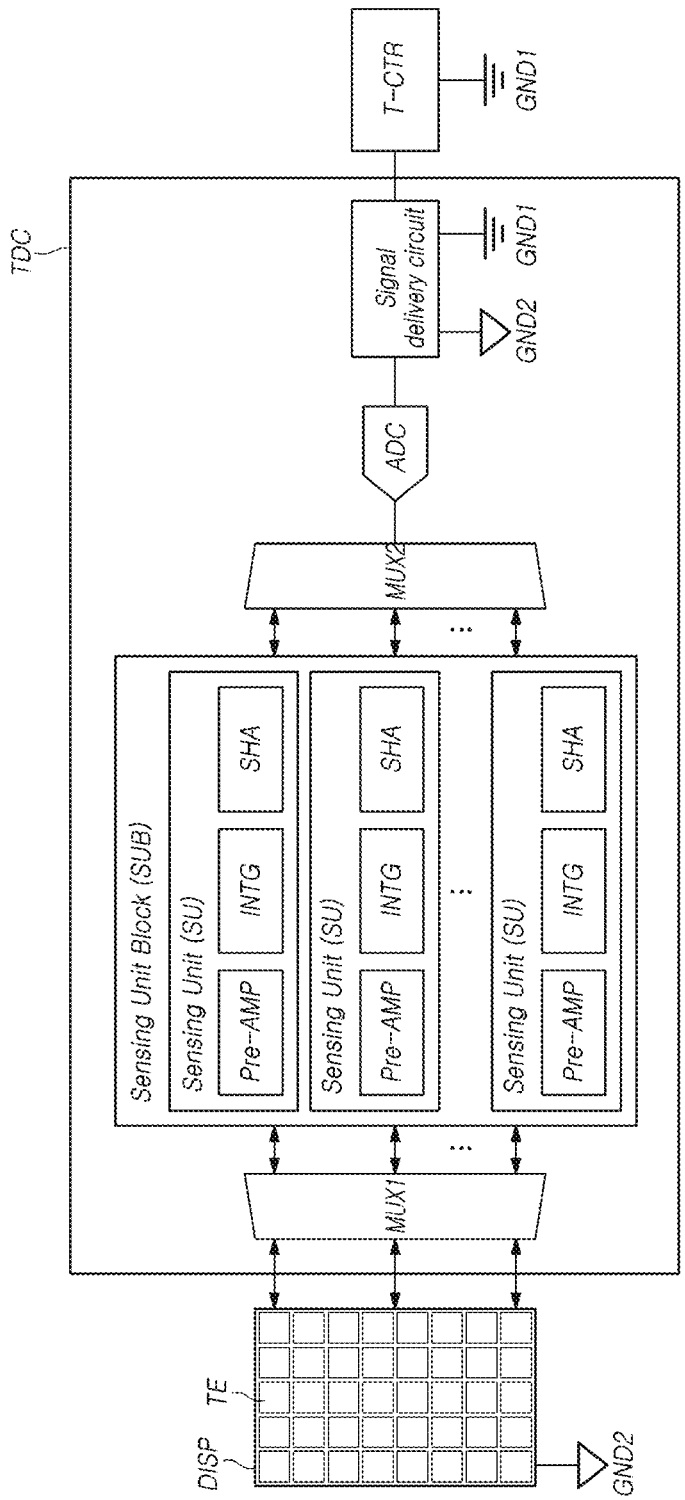
FIGS. 24 and 25 are block diagrams illustrating a touch driving circuit of a touch display device according to embodiments of the present disclosure.
Figure 25:
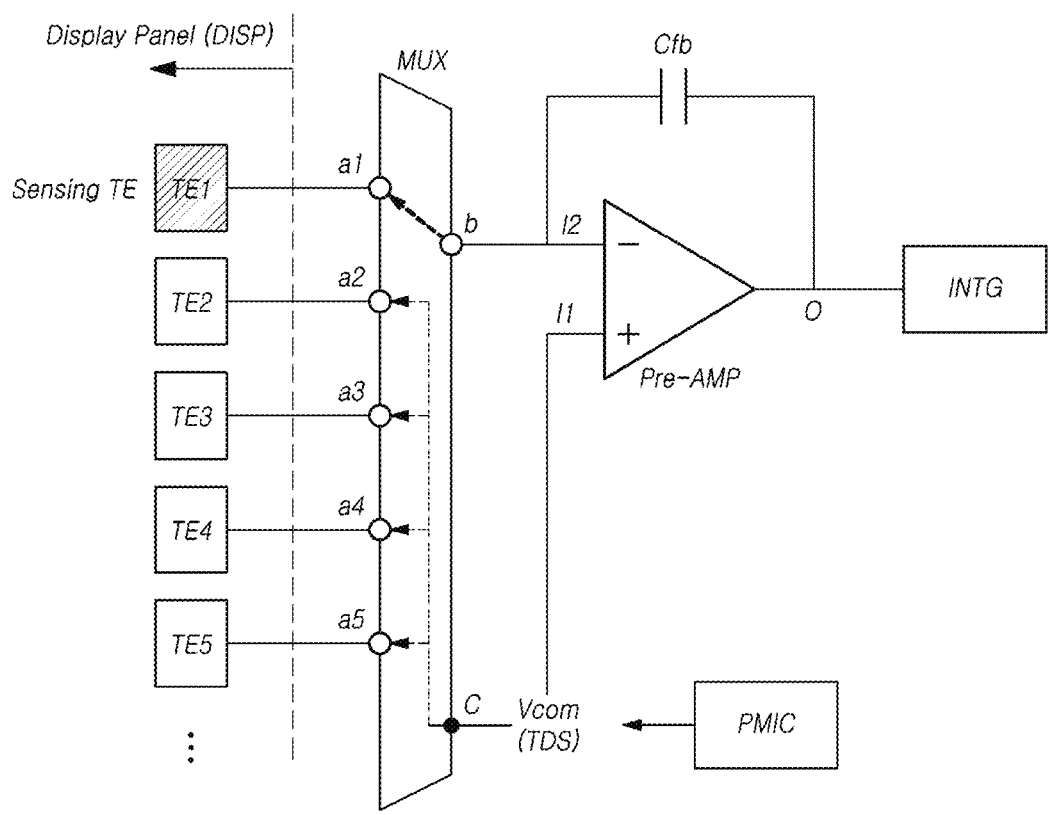

FIGS. 24 and 25 are block diagrams illustrating the touch driving circuit TDC of the touch display device 100 according to embodiments of the present disclosure.

The touch driving circuit TDC of the touch display device 100 according to embodiments of the present disclosure is a driving circuit configured to drive the multiple electrodes TE arranged in the display panel DISP.

The touch driving circuit TDC according to embodiments of the present disclosure may include a first multiplexer circuit MUX1, a sensing unit block SUB including multiple sensing units SU, a second multiplexer circuit MUX2, an analog-to-digital converter ADC, and and the like.

The first multiplexer circuit MUX1 may include at least one or two multiplexers. The second multiplexer circuit MUX2 may include at least one or two multiplexers.

Referring to FIGS. 24 and 25, each sensing unit SU may include a pre-amplifier Pre-AMP, an integrator INTG, a sample-and-hold circuit SHA, and the like.

The pre-amplifier Pre-AMP may be electrically connected to at least one or two touch electrodes TE.

The pre-amplifier Pre-AMP may receive a touch sensing signal from one sensing target touch electrode among the at least one or two touch electrodes TE to which the pre-amplifier Pre-AMP can be connected.

Referring to FIG. 25, a more specific example will be described. A multiplexer MUX included in the first multiplexer circuit MUX1 selectively connects, to the pre-amplifier Pre-AMP, one sensing target touch electrode TE1 among multiple touch electrodes TE1, TE2, TE3, TE4, TE5, . . . . That is, the multiplexer MUX may connect node a1, connected to the touch electrode TE1, to node b connected to the pre-amplifier Pre-AMP.

Accordingly, the pre-amplifier Pre-AMP receives, through a first input terminal I1, a common voltage Vcom which corresponds to a touch driving signal TDS and is output from the power management IC PMIC, and outputs the same through a second input terminal I2.

The common voltage Vcom output from the pre-amplifier Pre-AMP is supplied to the touch electrode TE1 selected by the multiplexer MUX.

The multiplexer MUX connects, to node c directly connected to the power management IC PMIC, nodes a2, a3, a4, a5, . . . connected to the touch electrodes TE2, TE3, TE4, TE5, . . . except for the sensing target touch electrode TE1 among the multiple touch electrodes TE1, TE2, TE3, TE4, TE5, . . . to which the multiplexer MUX can be connected.

The touch electrodes TE2, TE3, TE4, TE5, . . . except for the sensing target touch electrode TE1 among the multiple touch electrodes TE1, TE2, TE3, TE4, TE5, . . . to which the multiplexer MUX can be connected may be directly supplied with the common voltage Vcom without passing through the pre-amplifier Pre-AMP.

Thereafter, the pre-amplifier Pre-AMP may receive a touch sensing signal from the sensing target touch electrode TE1.

A feedback capacitor Cfb is charged by the received touch sensing signal, so that a signal output from an output terminal O of the pre-amplifier Pre-AMP can be input to the integrator INTG.

The pre-amplifier Pre-AMP and the integrator INTG may be implemented such that the former and the latter are integrated in one element.

The integrator INTG integrates signals output from the pre-amplifier Pre-AMP.

The analog-to-digital converter ADC may output, to the touch controller T-CTR, touch sensing data obtained by converting an integration value, which is output from the integrator INTG, into a digital value.

The analog-to-digital converter ADC may output the touch sensing data to the touch controller T-CTR grounded to the primary ground GND1.

The pre-amplifier Pre-AMP may receive touch sensing signals from the touch electrodes TE arranged in the display panel DISP grounded to the secondary ground GND2 different from the primary ground GND1.

By using the touch driving circuit TDC, touch sensing signals are received from the touch electrodes TE arranged in the display panel DISP grounded to the secondary ground GND2, and touch sensing data is output to the touch controller T-CTR grounded to the primary ground GND1, so as to enable the touch display device 100 having two types of grounds GND1 and GND2 to perform touch sensing.

The touch driving circuit TDC according to embodiments of the present disclosure may further include a signal delivery circuit 1600 configured to deliver a signal between the touch driving circuit TDC and the touch controller T-CTR.

In the present example, the signal delivery circuit 1600 included in the touch driving circuit TDC according to embodiments of the present disclosure may be grounded to both of the primary ground GND1 and the secondary ground GND2.

Figure 26:
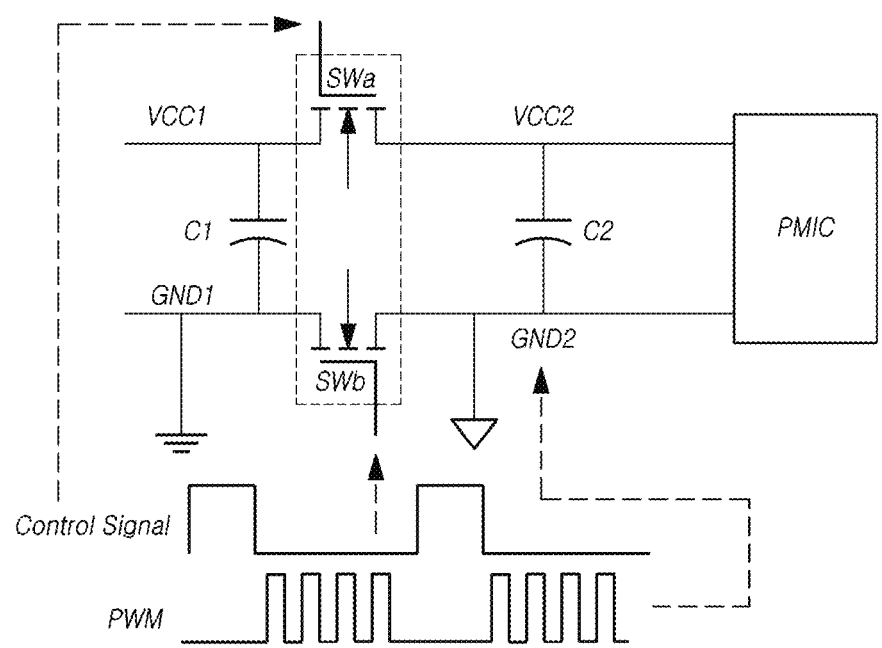
FIG. 26 is a diagram illustrating another example of a ground modulation circuit of a touch display device according to embodiments of the present disclosure.

FIG. 26 is a diagram illustrating another example of a ground modulation circuit GMC of the touch display device 100 according to embodiments of the present disclosure.

FIG. 26 illustrates a ground modulation circuit GMC of a type different from that of the flyback converter illustrated in FIG. 13.

The ground modulation circuit GMC uses switches SWa and SWb to control an input side of which one terminal receives as input the primary-side power source voltage VCC1 and the other terminal is connected to the primary ground GND1, and an output side which outputs the secondary-side power source voltage VCC2 to the power management IC PMIC.

On the input side, a first capacitor C1 is connected between the primary-side power source voltage VCC1 and the primary ground GND1.

On the output side, a second capacitor C2 is connected between the secondary-side power source voltage VCC2 and the secondary ground GND2.

The switches SWa and SWb may be turned on or off according to a voltage level of a control signal.

In order to supply the secondary-side power source voltage VCC2, the ground modulation circuit GMC cannot use a touch sensing time by as much time as the switches SWa and SWb are turned on.

When the ground modulation circuit GMC illustrated in FIG. 26 is used, the touch display device 100 according to embodiments of the present disclosure may provide time-free driving in which a touch driving time is shortened by as much time as the switches SWa and SWb are turned on.

Alternatively, when the ground modulation circuit GMC illustrated in FIG. 26 is used, the touch display device 100 according to embodiments of the present disclosure may provide time-division driving.

In the present example, a control signal corresponds to a synchronization signal TSYNC illustrated in FIG. 6.

When the level of a control signal is high, the touch display device 100 according to embodiments of the present disclosure may perform display driving, and may perform touch driving when the level of the control signal is low.

During a touch driving interval, a secondary ground voltage modulated by a pulse signal (e.g., PWM) may be applied to the display panel DISP.

However, during a display driving interval, the secondary ground voltage modulated by the pulse signal (e.g., PWM) is not be applied to the display panel DISP, but a DC ground voltage corresponding to a primary ground voltage may be applied thereto.

The above-described embodiments of the present disclosure provide a touch display device, a touch display panel, and a driving circuit which can simultaneously perform display driving and touch driving.

The above-described embodiments of the present disclosure provide a touch display device, a touch display panel, and a driving circuit which can simultaneously perform display driving and touch driving through a ground modulation technique.

The above-described embodiments of the present disclosure provide a touch display device, a touch display panel, and a driving circuit which can simultaneously perform display driving and touch driving without causing a harmful mutual influence between display driving and touch driving.

The above-described embodiments of the present disclosure provide a touch display device, a touch display panel, and a driving circuit which can perform display driving and touch driving by utilizing two types of grounds.

The above-described embodiments of the present disclosure provide a touch display device, a touch display panel, and a driving circuit which can no ally deliver a signal between differently-grounded components.

It will be apparent to those skilled in the art that various modifications and variations can be made in the touch display device, the touch display panel, and the driving circuit of the present disclosure without departing from the technical idea or scope of the disclosure. Thus, it is intended that the present disclosure cover the modifications and variations of this disclosure provided they come within the scope of the appended claims and their equivalents.

What is claimed is:

1. A touch display device, comprising:
   a touch display panel having multiple data lines and multiple gate lines arranged therein, having multiple touch electrodes arranged therein, and having multiple touch lines, which are electrically connected to the multiple touch electrodes so as to correspond to the multiple touch electrodes, arranged therein;
   a touch driving circuit configured to drive at least one touch electrode among the multiple touch electrodes; and
   a touch controller configured to sense whether there is a touch made by at least one of a finger and a pen, or a position of the touch on the basis of touch sensing data received from the touch driving circuit,
   wherein the touch controller is grounded to a primary ground,
   wherein the touch display panel is grounded to a secondary ground which is a ground different from the primary ground,
   wherein the touch display device further comprises a ground modulation circuit configured to apply a modulation signal to the primary ground or the secondary ground such that one ground voltage among a primary ground voltage of the primary ground and a secondary ground voltage of the secondary ground becomes a modulated ground voltage as compared with the remaining ground voltage, and
   wherein the ground modulation circuit applies, to the primary ground or the secondary ground, a reference modulation signal output from a modulator, or the modulation signal obtained by amplifying the reference modulation signal.

2. The touch display device of claim 1, wherein data voltages are supplied to the multiple data lines while a touch driving signal is supplied to the multiple touch electrodes.

3. The touch display device of claim 1, wherein the ground modulation circuit comprises a power source separation circuit configured to electrically separate the primary ground voltage from the secondary ground voltage.

4. The touch display device of claim 3, wherein the power source separation circuit comprises at least one of a transformer, a coupled inductor, and a converter.

5. The touch display device of claim 4, wherein the converter comprises at least one of a flyback converter, a flybuck converter, and a buck-boost converter.

6. The touch display device of claim 3, wherein the power source separation circuit comprises:
an input unit configured to be connected to the primary ground and receive, as input, a primary-side power source voltage;
a delivery unit configured to maintain or convert a level of the primary-side power source voltage and output the maintained or converted level thereof; and
an output unit configured to be connected to the secondary ground and output a secondary-side power source voltage output from the delivery unit,
wherein the input unit and the output unit are insulated from each other, and
the modulation signal is applied to the primary ground, connected to the input unit, or the secondary ground connected to the output unit.

7. The touch display device of claim 1, further comprising:
a data driving circuit configured to drive the multiple data lines;
a gate driving circuit configured to drive the multiple gate lines; and
a display controller configured to control the data driving circuit and the gate driving circuit,
wherein the display controller is grounded to the primary ground.

8. The touch display device of claim 7, where the data driving circuit is grounded to the secondary ground, and
further comprising a signal delivery circuit configured to deliver a signal between the data driving circuit and the display controller,
wherein the signal delivery circuit is included in one of the data driving circuit and the display controller, or is disposed between the data driving circuit and the display controller.

9. The touch display device of claim 7, where the gate driving circuit is grounded to the secondary ground, and
further comprising a signal delivery circuit configured to deliver a signal between the gate driving circuit and the display controller,
wherein the signal delivery circuit is included in one of the gate driving circuit and the display controller, or is disposed between the gate driving circuit and the display controller.

10. The touch display device of claim 1, where the touch driving circuit is grounded to the secondary ground, and
further comprising a signal delivery circuit configured to deliver signal between the touch driving circuit and the touch controller,
wherein the signal delivery circuit is included in one of the touch driving circuit and the touch controller, or is disposed between the touch driving circuit and the touch controller.

11. The touch display device of claim 7, comprising at least one driving integrated circuit,
wherein each of the at least one driving integrated circuit comprises the data driving circuit and the touch driving circuit, and is grounded to both of the primary ground and the secondary ground.

12. The touch display device of claim 1, wherein, with reference to the primary ground voltage, the secondary ground voltage and a touch driving signal applied to the touch electrodes are modulated signals, and
the secondary ground voltage has at least one signal characteristic corresponding to a signal characteristic of the touch driving signal among signal characteristics comprising a frequency, a phase, a voltage polarity, and an amplitude.

13. The touch display device of claim 1, wherein, with reference to the primary ground voltage, the secondary ground voltage and a data voltage applied to each of the data lines are modulated signals, and
the secondary ground voltage has at least one signal characteristic corresponding to a signal characteristic of the data voltage among signal characteristics comprising a frequency, a phase, a voltage polarity, and an amplitude.

14. A touch display panel, comprising:
multiple data lines for data driving;
multiple gate lines for gate driving;
multiple touch electrodes for touch sensing; and
multiple touch lines electrically connected to the multiple touch electrodes,
wherein data voltages are applied to the multiple data lines while a touch driving signal is applied to at least one touch electrode among the multiple touch electrodes,
wherein the touch driving signal applied to the at least one touch electrode among the multiple touch electrodes has at least one signal characteristic corresponding to a signal characteristic of a ground voltage of a ground, to which the touch display panel is grounded, among signal characteristics comprising a frequency, a phase, a voltage polarity, and an amplitude, and
wherein the ground is applied with a reference modulation signal output from a modulator, or a modulation signal obtained by amplifying the reference modulation signal.

15. A driving circuit for driving a touch display panel having multiple data lines and multiple gate lines arranged therein, having multiple touch electrodes arranged therein, and having multiple touch lines, which are electrically connected to the multiple touch electrodes so as to correspond to the multiple touch electrodes, arranged therein, the driving circuit comprising:
a data input unit configured to receive, as input, image data from a display controller;
a data converter configured to convert the image data into data voltages corresponding to analog voltages;
a data output unit configured to output the data voltages to data lines,
wherein the data input unit receives, as input, the image data from the display controller grounded to a primary ground, wherein the data output unit outputs the data voltages to data lines arranged in the touch display panel grounded to a secondary ground which is a ground different from the primary ground; and
a signal delivery circuit configured to deliver a signal between the driving circuit and the display controller,
wherein the signal delivery circuit is grounded to the primary ground and the secondary ground.

16. A driving circuit for driving a touch display panel having multiple data lines and multiple gate lines arranged therein, having multiple touch electrodes arranged therein, and having multiple touch lines, which are electrically connected to the multiple touch electrodes so as to correspond to the multiple touch electrodes, arranged therein, the driving circuit comprising:
    a pre-amplifier configured to receive touch sensing signals from the touch electrodes;
    an integrator configured to integrate a signal output from the pre-amplifier; and
    an analog-to-digital converter configured to output touch sensing data obtained by converting an integration value output from the integrator into a digital value,
    wherein the analog-to-digital converter outputs the touch sensing data to a touch controller grounded to a primary ground, and
    the pre-amplifier receives a touch sensing signals from the touch electrodes arranged in the touch display panel grounded to a secondary ground which is a ground different from the primary ground.

17. The driving circuit of claim 16, further comprising a signal delivery circuit configured to deliver a signal between the driving circuit and the touch controller,
    wherein the signal delivery circuit is grounded to the primary ground and the secondary ground.

18. A touch display device, comprising:
    a touch display panel having multiple data lines and multiple gate lines arranged therein, having multiple touch electrodes arranged therein, and having multiple touch lines, which are electrically connected to the multiple touch electrodes so as to correspond to the multiple touch electrodes, arranged therein;
    a driving circuit configured to drive the touch display panel; and
    a controller configured to control the driving circuit,
    wherein the controller is grounded to a primary ground,
    the touch display panel is grounded to a secondary ground which is a ground different from the primary ground,
    a secondary voltage of the secondary ground is a modulated ground voltage as compared with a primary ground voltage of the primary ground, and
    the touch display device further comprises a power source separation circuit configured to electrically separate the primary ground from the secondary ground, and a ground modulation circuit configured to apply, to the primary ground or the secondary ground, a reference modulation signal output from a modulator, or a modulation signal obtained by amplifying the reference modulation signal.

* * * * *